US012587342B2

(12) United States Patent
Liu et al.

(10) Patent No.: US 12,587,342 B2
(45) Date of Patent: Mar. 24, 2026

(54) METHODS AND APPARATUS FOR CONFIGURATION OF SOUNDING REFERENCE SIGNALS

(71) Applicant: Huawei Technologies Co., Ltd., Shenzhen (CN)

(72) Inventors: Jialing Liu, Palatine, IL (US); Weimin Xiao, Hoffman Estates, IL (US); Qian Cheng, Naperville, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 413 days.

(21) Appl. No.: 18/164,885

(22) Filed: Feb. 6, 2023

(65) Prior Publication Data

US 2023/0179372 A1      Jun. 8, 2023

Related U.S. Application Data

(63) Continuation of application No. PCT/US2021/040273, filed on Jul. 2, 2021.

(60) Provisional application No. 63/061,578, filed on Aug. 5, 2020.

(51) Int. Cl.
*H04L 5/00* (2006.01)

(52) U.S. Cl.
CPC .................................. *H04L 5/0051* (2013.01)

(58) Field of Classification Search
CPC ... H04L 5/0051; H04L 5/0094; H04L 5/0044; H04L 5/0048; H04L 5/0053; H04L 27/2605; H04L 27/2607; H04L 27/261
See application file for complete search history.

(56) References Cited

U.S. PATENT DOCUMENTS

| | | | |
|---|---|---|---|
| 2013/0156014 A1 | 6/2013 | Kim et al. | |
| 2018/0070369 A1* | 3/2018 | Papasakellariou .... | H04W 72/20 |
| 2020/0059907 A1 | 2/2020 | Joseph et al. | |
| 2020/0177339 A1 | 6/2020 | Hessler et al. | |
| 2021/0120572 A1 | 4/2021 | Chen | |
| 2021/0195618 A1 | 6/2021 | Yuan | |
| 2021/0377876 A1 | 12/2021 | Jeon | |

(Continued)

FOREIGN PATENT DOCUMENTS

| | | | |
|---|---|---|---|
| CN | 113541901 A | * | 10/2021 |
| WO | 2011142608 A2 | | 11/2011 |

OTHER PUBLICATIONS

Ericsson, "Remaining Issue of UCI Enhancements for NR URLLC," Agenda Item 7.2.5.2, 3GPP Meeting TSG-RAN WG1 Meeting #100, Tdoc R1-2000231, Feb. 24-Mar. 6, 2020, 8 pages.

*Primary Examiner* — Derrick V Rose
(74) *Attorney, Agent, or Firm* — Slater Matsil, LLP

(57) ABSTRACT

A method implemented by an access node includes transmitting, by the access node to a user equipment (UE), a control information message scheduling a physical downlink shared channel (PDSCH), the control information message comprising at least one parameter for the PDSCH and a sounding reference signal (SRS) request field; receiving, by the access node from the UE, a SRS transmission in accordance with the at least one parameter for the PDSCH and the SRS request field transmitted in the control information message; and transmitting, by the access node to the UE, the scheduled PDSCH in accordance with the at least one parameter for the PDSCH transmitted in the control information message.

20 Claims, 14 Drawing Sheets

(56)    References Cited

U.S. PATENT DOCUMENTS

| 2022/0159702 | A1 | 5/2022 | Seo | |
| 2022/0224472 | A1 | 7/2022 | Kim | |
| 2022/0239431 | A1* | 7/2022 | Okamura | H04W 52/367 |
| 2022/0345195 | A1 | 10/2022 | Jang | |
| 2022/0353698 | A1 | 11/2022 | Jang | |
| 2023/0007680 | A1* | 1/2023 | Aiba | H04W 72/23 |
| 2023/0124582 | A1 | 4/2023 | Frenne | |
| 2023/0209567 | A1 | 6/2023 | Grossmann | |
| 2023/0216632 | A1* | 7/2023 | Go | H04L 5/0094 |
| | | | | 370/329 |
| 2023/0262449 | A1* | 8/2023 | Ying | H04L 5/0044 |
| | | | | 370/329 |

* cited by examiner

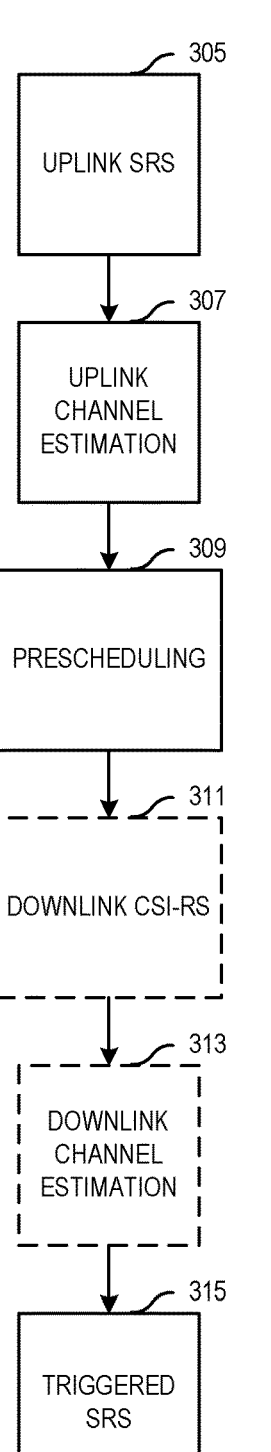

300

305 — UPLINK SRS

- UNPRECODED FOR PURPOSE OF UL CHANNEL ESTIMATION; SENT BY ACTIVE UES TO ASSIST NETWORK IN PRESCHEDULING.
- INSTEAD OF UL SRS, FEEDBACK FROM UE MAY BE USED FOR PRESCHEDULING.

307 — UPLINK CHANNEL ESTIMATION

- NETWORK ESTIMATES UL CHANNEL BASED ON UL SRS.

309 — PRESCHEDULING

- NETWORK PRESCHEDULES UES, SENDS GROUP DCI FOR PRESCHEDULED UES TO TRIGGER SRS AND CSI-RS (IF CSI-RS IS TO BE SENT).
- ACTUAL SCHEDULING AND DATA TRANSMISSION IS FOLLOWED IN LATER STEPS.

311 — DOWNLINK CSI-RS

- NETWORK TRANSMITS PRECODED OR UNPRECODED CSI-RS.
- CSI-RS MAY OR MAY NOT BE TRANSMITTED.

313 — DOWNLINK CHANNEL ESTIMATION

- UE ESTIMATES DL CHANNEL BASED ON DL CSI-RS.

315 — TRIGGERED SRS

- PRESCHEDULED UES TRANSMIT SRS.
- SRS PRECODED OR UNPRECODED (NO INFORMATION).
- SRS BASED ON RECEIVED DCI ON ASSIGNED SUBBANDS, PORTS, COMB, AND CYCLIC SHIFTS.

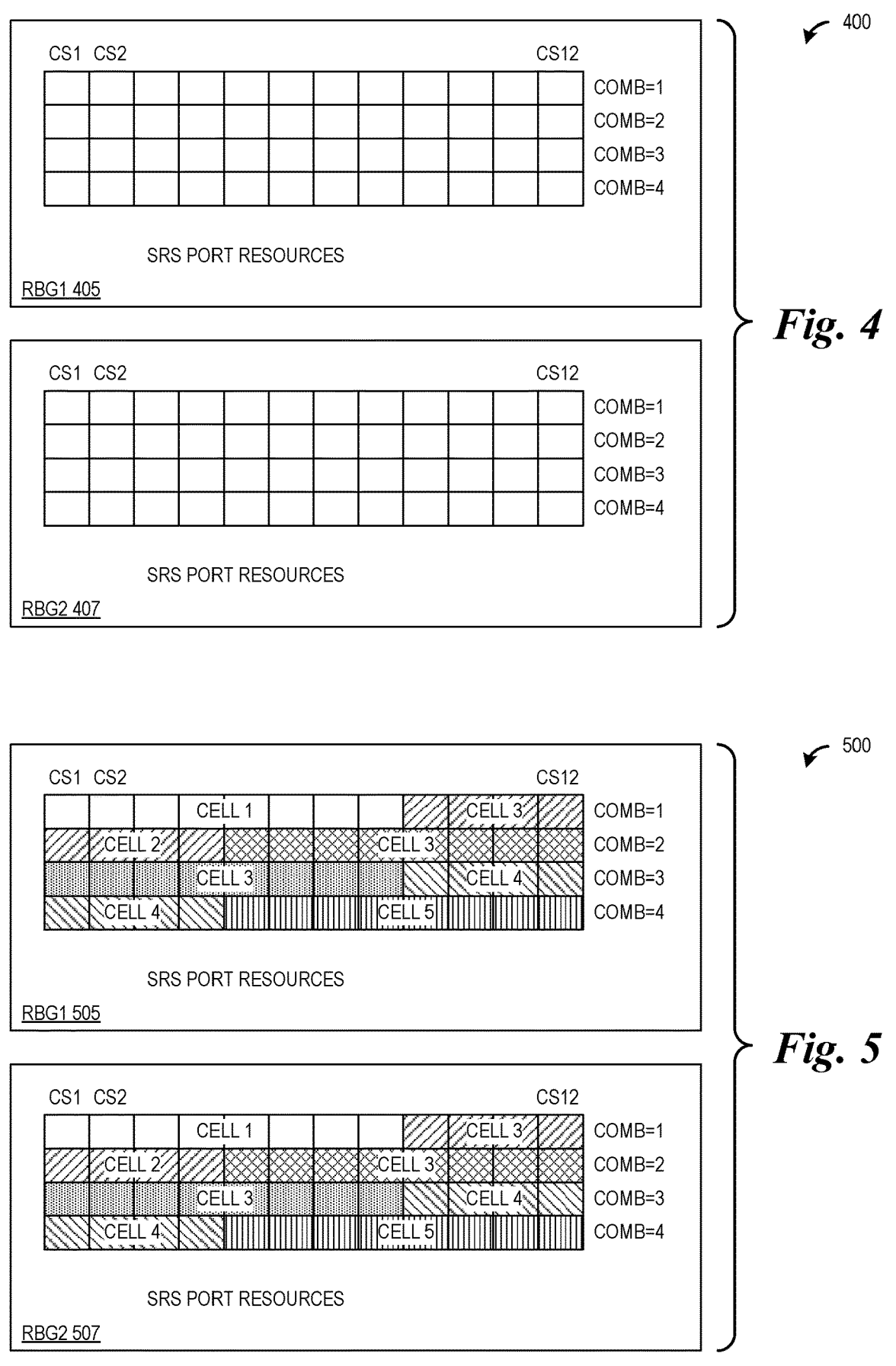

|  |  |  |  |  |  |  |  |  |  |  |  |
|--|--|--|--|--|--|--|--|--|--|--|--|
|  |  |  |  |  |  |  |  |  |  |  |  | COMB=1
|  |  |  |  |  |  |  |  |  |  |  |  | COMB=2
|  |  |  |  |  |  |  |  |  |  |  |  | COMB=3
|  |  |  |  |  |  |  |  |  |  |  |  | COMB=4

SRS PORT RESOURCES

RBG1 405

CS1　CS2　　　　　　　　　　　　　　　CS12

|  |  |  |  |  |  |  |  |  |  |  |  |
|--|--|--|--|--|--|--|--|--|--|--|--|
|  |  |  |  |  |  |  |  |  |  |  |  | COMB=1
|  |  |  |  |  |  |  |  |  |  |  |  | COMB=2
|  |  |  |  |  |  |  |  |  |  |  |  | COMB=3
|  |  |  |  |  |  |  |  |  |  |  |  | COMB=4

SRS PORT RESOURCES

RBG2 407

| CELL 1 | | CELL 3 | COMB=1 |
| CELL 2 | CELL 3 | | COMB=2 |
| CELL 3 | | CELL 4 | COMB=3 |
| CELL 4 | CELL 5 | | COMB=4 |

SRS PORT RESOURCES

RBG1 505

CS1　CS2　　　　　　　　　　　　　　　CS12

| CELL 1 | | CELL 3 | COMB=1 |
| CELL 2 | CELL 3 | | COMB=2 |
| CELL 3 | | CELL 4 | COMB=3 |
| CELL 4 | CELL 5 | | COMB=4 |

SRS PORT RESOURCES

RBG2 507

*Fig. 5*

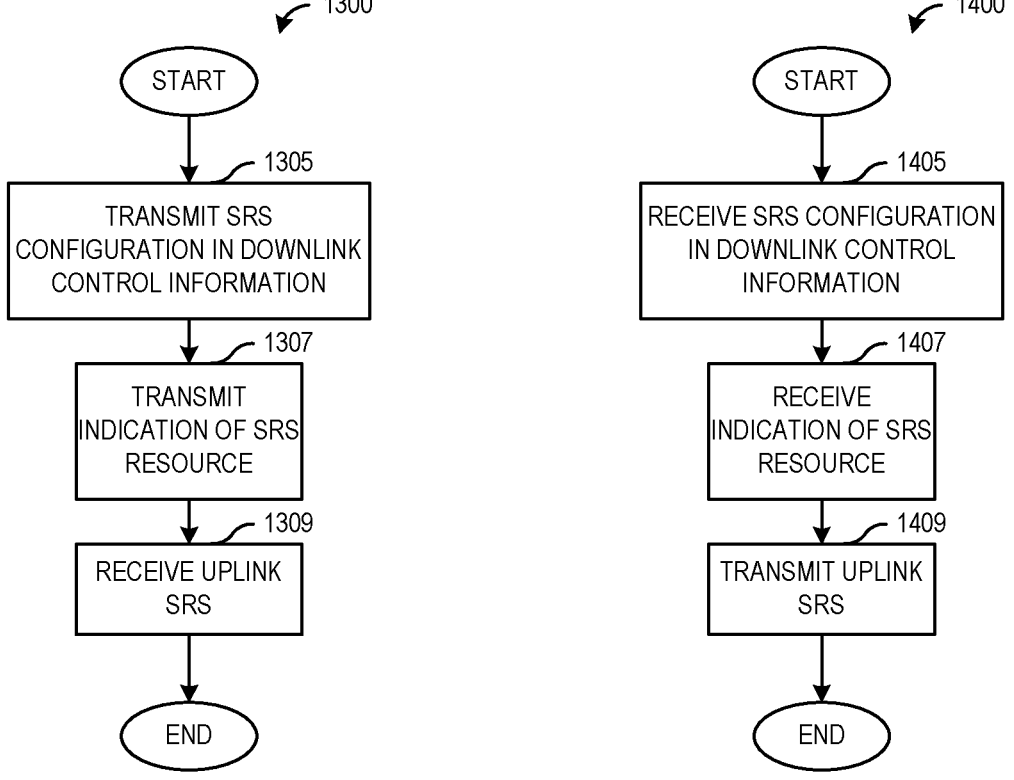
*Fig. 13*                    *Fig. 14*

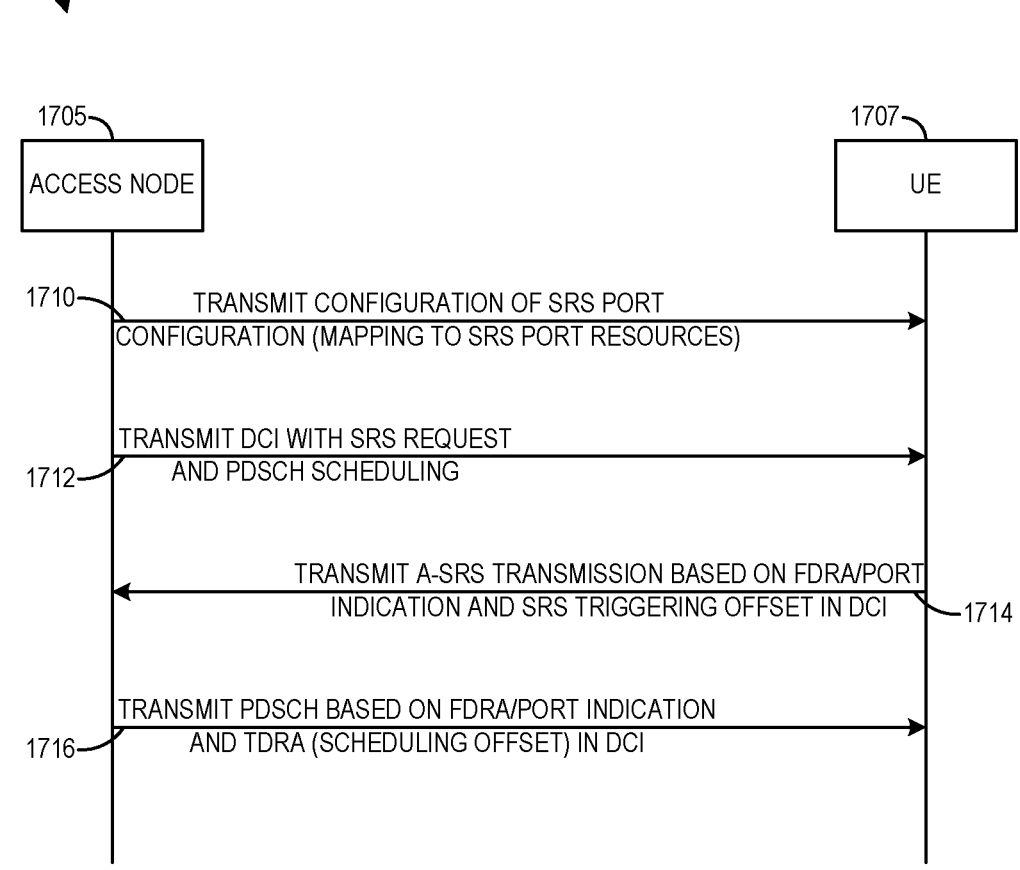

1700

1705 — ACCESS NODE

1707 — UE

1710 — TRANSMIT CONFIGURATION OF SRS PORT CONFIGURATION (MAPPING TO SRS PORT RESOURCES)

1712 — TRANSMIT DCI WITH SRS REQUEST AND PDSCH SCHEDULING

TRANSMIT A-SRS TRANSMISSION BASED ON FDRA/PORT INDICATION AND SRS TRIGGERING OFFSET IN DCI — 1714

1716 — TRANSMIT PDSCH BASED ON FDRA/PORT INDICATION AND TDRA (SCHEDULING OFFSET) IN DCI

THE A-SRS MAY ALSO BE BASED ON THE CARRIER INDICATOR FIELD, BANDWIDTH PART INDICATOR FIELD, VRB-PRB MAPPING FIELD, PRB BUNDLING SIZE FIELD, TPC COMMAND FOR THE PUCCH FIELD OR TPC COMMAND FOR THE SRS FIELD IN THE DCI. THE SRS TRIGGERING OFFSET MAY BE INDICATED IN A TDRA FIELD (REUSED DESIGN FROM PUSCH OR PDSCH). A CMR AND OPTIONALLY IMR MAY BE INCLUDED FOR THE UE TO DETERMINE THE SRS PRECODING, WHICH MAY REUSE THE DESIGN OF CSI REQUEST FIELD.

*Fig. 17*

METHODS AND APPARATUS FOR CONFIGURATION OF SOUNDING REFERENCE SIGNALS

CROSS-REFERENCE TO RELATED APPLICATIONS

This application is a continuation of International Application No. PCT/US2021/040273, filed on Jul. 2, 2021, entitled "Methods and Apparatus for Configuration of Sounding Reference Signals," which claims the benefit of U.S. Provisional Application No. 63/061,578, filed on Aug. 5, 2020, entitled "Methods and Apparatus for Sounding Enhancements," which applications are hereby incorporated herein by reference in their entirety. This application is related to International Application No. PCT/US2021/040279, filed on Jul. 2, 2021, entitled "Methods and Apparatus for Signaling Sounding Reference Signals and Control Signals," which is hereby incorporated by reference in its entirety.

TECHNICAL FIELD

The present disclosure relates generally to methods and apparatus for digital communications, and, in particular embodiments, to methods and apparatus for configuration of sounding reference signals.

BACKGROUND

Sounding reference signals (SRSs) are reference signals transmitted by user equipments (UEs) in the uplink for the purpose of enabling uplink channel estimation over a wide bandwidth. As such, the network may be able to perform communication with the UEs based on the uplink channel estimation. Moreover, due to channel reciprocity between the uplink and the downlink present in a time division duplex (TDD) communication system, the network may utilize the SRSs to perform dynamic scheduling. That is, the network may exploit channel-dependent scheduling. In this case, the time-frequency resources are dynamically scheduled, taking into account the different traffic priorities and quality of services requirements. Typically, the UEs monitor several Physical Downlink Control Channels (PDCCHs) to acquire the scheduling decisions, which are signaled to the UEs by the network. Upon the detection of a valid PDCCH, the UE follows the scheduling decision and receives (or transmits) data.

The configuration of SRS related parameters of a SRS to be transmitted in the uplink (such as SRS transmission ports, SRS transmission bandwidth, SRS resources sets, transmission comb and cyclic shift, etc.) are semi-static in nature and may be provided through higher layer signaling, such as radio resource control (RRC) signaling. A more dynamic technique to signal the configuration is needed to better associate the SRS parameters (such as the SRS transmission bandwidth and/or ports) with the Physical Data Shared Channel (PDSCH) parameters. Moreover, the association between the downlink reference signals, such as Channel State Information Reference Signals (CSI-RS) or demodulation reference signals (DMRS), and the uplink SRS must be conveyed to the UE to accurately reflect the interference situation and perform optimal beamforming. Thus, there is a need for apparatus and methods for configuration of sounding reference signals, including signaling control information that accurately indicates a more dynamic configuration (not semi-static) of the aforementioned parameters, such as, for example, a portion of the transmission bandwidth required to transmit a subset of the SRS resource set (thereby implicitly indicating a transmission comb and cyclic shift) using a subset of the transmission ports associated with a particular set of downlink reference signals. The signaling of the control information may be closely tied to an actual data transmission. The transmission of the SRS may be periodic (i.e., periodic SRS, P-SRS or P SRS) as configured by Layer 3 RRC configuration signaling, semi-persistence (i.e., semi-persistent SRS, SP-SRS or SP SRS) activated/deactivated via Layer 2 media access control (MAC) control element (CE), or aperiodic (i.e., aperiodic SRS, A-SRS or AP-SRS or A SRS or AP SRS) indicated by Layer 1 downlink control information (DCI) in PDCCH.

SUMMARY

According to a first aspect, a method implemented by an access node is provided. The method comprising: transmitting, by the access node to a user equipment (UE), a control information message scheduling a physical downlink shared channel (PDSCH), the control information message comprising at least one parameter for the PDSCH and a sounding reference signal (SRS) request field; receiving, by the access node from the UE, a SRS transmission in accordance with the at least one parameter for the PDSCH and the SRS request field transmitted in the control information message; and transmitting, by the access node to the UE, the scheduled PDSCH in accordance with the at least one parameter for the PDSCH transmitted in the control information message.

In a first implementation form of the method according to the first aspect, the at least one parameter for the PDSCH comprising at least one of a frequency domain parameter, or a spatial domain parameter.

In a second implementation form of the method according to the first aspect or any preceding implementation form of the first aspect, the control information message comprising at least one of a downlink control information (DCI) message, a media access control (MAC) control element (CE), or a radio resource control (RRC) configuration message.

In a third implementation form of the method according to the first aspect or any preceding implementation form of the first aspect, the control information message further comprising at least one aperiodic SRS (A-SRS) time domain parameter.

In a fourth implementation form of the method according to the first aspect or any preceding implementation form of the first aspect, the frequency domain parameter comprising a frequency domain resource assignment (FDRA) field in the control information message.

In a fifth implementation form of the method according to the first aspect or any preceding implementation form of the first aspect, the SRS transmission being received in accordance with at least one physical resource block (PRB) associated with the FDRA field, and the PDSCH being transmitted in accordance with the at least one PRB associated with the FDRA

FIELD

In a sixth implementation form of the method according to the first aspect or any preceding implementation form of the first aspect, the spatial domain parameter comprising an antenna port field in the control information message.

In a seventh implementation form of the method according to the first aspect or any preceding implementation form of the first aspect, the PDSCH being transmitted with antenna ports associated with the antenna port field.

In an eighth implementation form of the method according to the first aspect or any preceding implementation form of the first aspect, the at least one A-SRS time domain parameter comprising a first SRS time domain resource assignment (TDRA) field in the control information message.

In a ninth implementation form of the method according to the first aspect or any preceding implementation form of the first aspect, the at least one A-SRS time domain parameter comprising at least one of a SRS slot indication, a SRS start symbol indication, or a SRS allocation length indication in the control information message.

In a tenth implementation form of the method according to the first aspect or any preceding implementation form of the first aspect, the SRS transmission being received in a first slot indicated by the first TDRA field, and the PDSCH being transmitted in a second slot indicated by a second TDRA field for the PDSCH.

In an eleventh implementation form of the method according to the first aspect or any preceding implementation form of the first aspect, the first TDRA field comprising a group common triggering offset field.

In a twelfth implementation form of the method according to the first aspect or any preceding implementation form of the first aspect, the PDSCH being a semi-persistent scheduled (SPS) PDSCH activated by the control information message, the SRS being a semi-persistent (SP) SRS activated by the control information message, and the control information message including a Cyclic redundancy check (CRC) scrambled by a Configured Scheduling (CS) Radio Network Temporary Identifier (RNTI) (CS-RNTI).

According to a second aspect, a method implemented by a UE is provided. The method comprising: receiving, by the UE to an access node, a control information message scheduling a PDSCH, the control information message comprising at least one parameter for the PDSCH and a SRS request field; transmitting, by the UE from the access node, a SRS transmission in accordance with the at least one parameter for the PDSCH and the SRS request field received in the control information message; and receiving, by the UE to the access node, the PDSCH in accordance with the at least one parameter for the PDSCH received in the control information message.

In a first implementation form of the method according to the second aspect, the at least one parameter for the PDSCH comprising at least one of a frequency domain parameter, or a spatial domain parameter.

In a second implementation form of the method according to the second aspect or any preceding implementation form of the second aspect, the control information message further comprising at least one A-SRS time domain parameter.

In a third implementation form of the method according to the second aspect or any preceding implementation form of the second aspect, the frequency domain parameter comprising a FDRA field in the control information message.

In a fourth implementation form of the method according to the second aspect or any preceding implementation form of the second aspect, the SRS transmission being transmitted in accordance with at least one PRB associated with the FDRA field, and the PDSCH being received in accordance with the at least one PRB associated with the FDRA field.

In a fifth implementation form of the method according to the second aspect or any preceding implementation form of the second aspect, the spatial domain parameter comprising an antenna port field in the control information message.

In a sixth implementation form of the method according to the second aspect or any preceding implementation form of the second aspect, the PDSCH being received with antenna ports associated with the antenna port field.

In a seventh implementation form of the method according to the second aspect or any preceding implementation form of the second aspect, the at least one A-SRS time domain parameter comprising a first SRS TDRA field in the control information message.

In an eighth implementation form of the method according to the second aspect or any preceding implementation form of the second aspect, the at least one A-SRS time domain parameter comprising at least one of a SRS slot indication, a SRS start symbol indication, or a SRS allocation length indication in the control information message.

In a ninth implementation form of the method according to the second aspect or any preceding implementation form of the second aspect, the SRS transmission being transmitted in a first slot indicated by the first TDRA field, and the PDSCH being received in a second slot indicated by a second TDRA field for the PDSCH.

In a tenth implementation form of the method according to the second aspect or any preceding implementation form of the second aspect, the first TDRA field comprising a group common triggering offset field. According to a third aspect, an access node is provided. The access node comprising: one or more processors; and a non-transitory memory storage comprising instructions that, when executed by the one or more processors, cause the access node to: transmit, to a UE, a control information message scheduling a PDSCH, the control information message comprising at least one parameter for the PDSCH and a SRS request field; receive, from the UE, a SRS transmission in accordance with the at least one parameter for the PDSCH and the SRS request field transmitted in the control information message; and transmit, to the UE, the scheduled PDSCH in accordance with the at least one parameter for the PDSCH transmitted in the control information message.

In a first implementation form of the access node according to the third aspect, the at least one parameter comprising at least one of a frequency domain parameter, or a spatial domain parameter.

In a second implementation form of the access node according to the third aspect or any preceding implementation form of the third aspect, the control information message further comprising at least one A-SRS time domain parameter.

In a third implementation form of the access node according to the third aspect or any preceding implementation form of the third aspect, the frequency domain parameter comprising a FDRA field in the control information message.

In a fourth implementation form of the access node according to the third aspect or any preceding implementation form of the third aspect, the SRS transmission being received in accordance with at least one PRB associated with the FDRA field, and the PDSCH being transmitted in accordance with the at least one PRB associated with the FDRA field.

In a fifth implementation form of the access node according to the third aspect or any preceding implementation form of the third aspect, the spatial domain parameter comprising an antenna port field in the control information message.

In a sixth implementation form of the access node according to the third aspect or any preceding implementation form of the third aspect, the PDSCH being transmitted with antenna ports associated with the antenna port field.

In a seventh implementation form of the access node according to the third aspect or any preceding implementation form of the third aspect, the at least one A-SRS time domain parameter comprising a first SRS TDRA field in the control information message.

In an eighth implementation form of the access node according to the third aspect or any preceding implementation form of the third aspect, the at least one A-SRS time domain parameter comprising at least one of a SRS slot indication, a SRS start symbol indication, or a SRS allocation length indication in the control information message.

In a ninth implementation form of the access node according to the third aspect or any preceding implementation form of the third aspect, the SRS transmission being received in a first slot indicated by the first TDRA field, and the PDSCH being transmitted in a second TDRA field for the PDSCH.

In a tenth implementation form of the access node according to the third aspect or any preceding implementation form of the third aspect, the first TDRA field comprising a group common triggering offset field.

An advantage of a preferred embodiment is that SRS configured parameters (SRS transmission bandwidth and/or ports) are associated with the PDSCH parameters (bandwidth and/or ports) and/or the CSI-RS parameters (bandwidth and/or ports).

Yet another advantage of a preferred embodiment is that control information, such as the SRS transmission bandwidth, SRS transmission ports, and SRS resource sets including the SRS transmission comb and cyclic shift, are dynamically signaled for prescheduled (or scheduled) UEs after configuration through higher layer signaling, such as, for example, through RRC or MAC CE signaling.

Yet another advantage of a preferred embodiment is that dynamic signaling of the control information does not significantly increase the communications overhead, thereby minimizing the impact on the overall performance of the communications system.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 illustrates a flow diagram of operations occurring in an interference probing process;

FIGS. 4 and 5 illustrate diagrams of RGBs, and example mapping of SRS resources and ports according to example embodiments presented herein;

FIG. 13 illustrates a flow diagram of example operations occurring in an access node configuring uplink SRSs according to example embodiments presented herein;

FIG. 14 illustrates a flow diagram of example operations occurring in a UE transmitting uplink SRSs according to example embodiments presented herein;

FIG. 17 illustrates a diagram of information exchanged between an access node and a UE as the access node configures UL SRS sounding and then makes a DL transmission based on the UL SRS sounding results according to example embodiments presented herein;

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
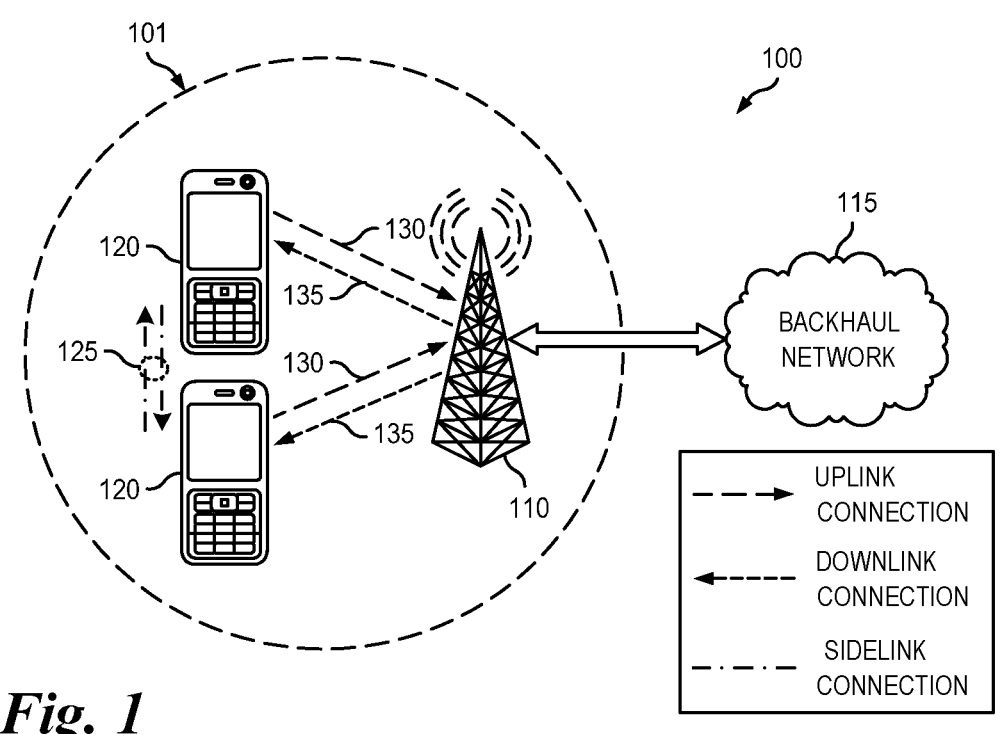
FIG. 1 illustrates a first example communications system.

FIG. 1 illustrates a first example communications system 100. Communications system 100 includes an access node 110, with coverage area 101, serving user equipments (UEs), such as UEs 120. Access node 110 is connected to a backhaul network 115 that provides connectivity to services and the Internet. In a first operating mode, communications to and from a UE passes through access node 110. In a second operating mode, communications to and from a UE do not pass through access node 110, however, access node no typically allocates resources used by the UE to communicate when specific conditions are met. Communication between a UE pair in the second operating mode occurs over sidelinks 125, comprising uni-directional communication links. Communication between a UE and access node pair also occur over uni-directional communication links, where the communication links between the UE and the access node are referred to as uplinks 130, and the communication links between the access node and UE is referred to as downlinks 135.

Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. It is noted that when relaying is used (based on relays, picos, CPEs, and so on), especially multihop relaying, the boundary between a controller and node controlled by the controller may become blurry, and a dual node (either the controller or the node controlled by the controller) deployment where a first node that provides configuration or control information to a second node is considered to be the controller. Likewise, the concept of UL and DL transmissions can be extended as well.

A cell may include one or more bandwidth pairs (BWPs) for UL or DL allocated for a UE. Each BWP may have its own BWP-specific numerology and configuration. It is noted that not all BWPs need to be active at the same time for the UE. A cell may correspond to one or more carriers. Typically, one cell (a primary cell (PCell) or a secondary cell (SCell), for example) is a component carrier (a primary component carrier (PCC) or a secondary CC (SCC), for example). For some cells, each cell may include multiple carriers in UL, one carrier is referred to as an UL carrier or non-supplementary UL (non-SUL) UL carrier which has an associated DL, and other carriers are called a supplementary UL (SUL) carriers which do not have an associated DL. A cell, or a carrier, may be configured with slot or subframe formats comprised of DL and UL symbols, and that cell or carrier is seen as operating in time division duplexed (TDD) mode. In general, for unpaired spectrum, the cells or carriers are in TDD mode, and for paired spectrum, the cells or carrier are in a frequency division duplexed (FDD) mode.

Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, sixth generation (6G), High Speed Packet Access (HSPA), the IEEE 802.11 family of standards, such as 802.11a/b/g/n/ac/ad/ax/ay/be, etc. As used herein, the term network refers to entities of a communications system other than UEs. While it is understood that communications systems may employ multiple access nodes capable of communicating with a number of UEs, only one access node and two UEs are illustrated for simplicity.

In standard antenna element to element channel estimation, a channel between two devices is estimated by having a first device transmit a known signal on a known time or frequency resource(s) to a second device, the received signal at the second device is expressible as:

$$y = Hx + n \qquad (1)$$

where y is the received signal at the second device, x is the known signal (which may be a reference signal, a pilot, or a pilot signal), H is the channel model or response, and n is the noise (and interference for some communication channels). Because x is known by the second device, it is possible for the second device to determine or estimate H from y.

It is noted that the concept of antenna, antenna element, and antenna port may be generally interchangeable, but in some specific scenarios, they can mean different but related subjects. For example, one transmit (Tx) antenna port may be formed (or virtualized) by multiple antenna elements or antennas, and the receiver sees only the one Tx antenna port but not each of the multiple antenna elements or antennas. The virtualization may be achieved via beamforming, for example.

Figure 2:
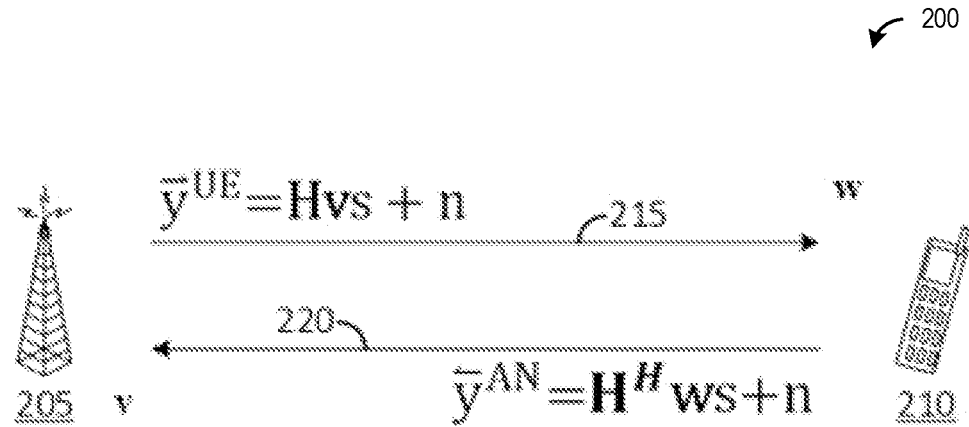
FIG. 2 illustrates an example communications system, providing mathematical expressions of signals transmitted in the communications system.

FIG. 2 illustrates an example communications system 200, providing mathematical expressions of signals transmitted in the communications system. Communications system 200 includes an access node 205 communicating with UE 210. As shown in FIG. 2, access node 205 is using a transmit filter v and UE 210 is using a receive filter w. Both access node 205 and UE 210 use linear precoding or combining. Assuming H is $N_{rx} \times N_{tx}$ matrix of a MIMO system, i.e., there are $N_{tx}$ transmit antennas and $N_{rx}$ receive antennas. The transmit filter v of dimension $N_{tx} \times Ns$ enables the transmitter to precode or beamform the transmitted signal, where Ns is the number of layers, streams, symbols, pilots, messages, or known sequences transmitted. The receive filter w of multi-antenna systems is of dimension $N_{rx} \times Ns$ and represents the combining matrix. It is noted that the above description is for a transmission from access node 205 to UE 210, i.e., a downlink transmission. The transmission may also occur at the reverse direction (an uplink transmission), for which the channel matrix becomes $H^H$, which is the Hermitian of channel model H, and w may be seen as the transmit filter and v as the receiver filter. The w for transmission and the w for reception may or may not be the same, and likewise for v.

A downlink (or forward) channel 215 between access node 205 and UE 210 has channel model or response H, while an uplink (or backward, or reverse) channel 220 between UE 210 and access node 205 has channel model or response $H^H$, which is the Hermitian of channel model H. Although FIG. 2 depicts only one access node and one UE, it is not limited to this case. Multiple UEs may be served by the access node, on different time-frequency resources (such as FDM-TDM, as in typical cellular systems) or on the same time-frequency resources (such as MU-MIMO, wherein multiple UEs are paired together and each UE is individually precoded). Among the paired UEs, there is intra-cell interference. Also multiple access nodes may exist in the network, some of which may be cooperatively serving UE 210 in a joint transmission fashion (such as coherent joint transmission, non-coherent joint transmission, coordinated multipoint transmission etc.), dynamic point switching fashion, and so on. Some other access nodes may not serve UE 210 and their transmissions to their UEs cause inter-cell interference to UE 210. The scenario of multiple access nodes and multiple UEs, with access node cooperation to serve a UE and with MU-MIMO, is a scenario considered herein, and the example embodiments of bi-directional training applies to this scenario.

According to an example embodiment, precoded, unprecoded, or both precoded and unprecoded uplink SRSs are transmitted by UEs to access nodes to assist in dynamic scheduling. These uplink SRSs include specific transmission parameters (such as specific transmission ports, transmission comb, cyclic shift, transmission bandwidth (related to the SRS resources), etc.) that may be configured through higher layer signaling (such as through radio resource control (RRC) or media access control (MAC) control element (CE)

signaling, for example). In some cases, the uplink SRS may be unprecoded to support uplink channel estimation and assist the network in prescheduling. Upon performing uplink channel estimation, the network preschedules UEs. The prescheduling of UEs may involve a selection of UEs from a plurality of UEs configured by the access node, where the selected UEs comprise UEs that are suitable for receiving (or transmitting) data. Hence, the selected UEs comprise a subset of the plurality of UEs configured by the access node. The selected UEs may be referred to as prescheduled UEs. The suitability of a UE may be determined based on factors such as channel quality, signal quality, error rate, data transfer history, quality of service restrictions, etc.

The prescheduling of UEs may precede an actual scheduling required for a data transmission (or reception) and the actual data transmission (or reception). In general, scheduling is not predictable. That is, the number of UEs and which subset of UEs selected for prescheduling are not known during higher layer configuration. Therefore, after prescheduling, the network may decide to re-configure the semi-static configured SRS parameters based on the subset of UEs chosen in prescheduling. As such, apparatus and methods for configuration of SRSs are needed.

Interference probing and prescheduling may be performed by the network after UEs transmit the uplink SRS. As described previously, prescheduling is a process where the access node selects a subset of the UEs, which the access node has configured, for data transmission or reception. The selected UEs may be configured to transmit precoded SRSs. These precoded SRSs may be referred to as triggered SRSs. The access node may use the precoded SRSs to determine a downlink precoder (referred to as transmit filter v in FIG. 2 above). The prescheduling may precede the actual scheduling for data transmission (or reception) and may be performed during a training phase (such as for example during bi-directional training (BIT)) to determine the downlink precoder (and combiners).

BIT, also commonly referred to as forward-backward training, is a generally distributed training procedure with low computational complexity that is used to train and update transmit precoders and receive combiners without explicitly estimating the CSI. BIT may adapt transmit beamformers (which may also be commonly known as transmit precoders, transmission filters, spatial transmission filters, transmit filter, analog precoder, and the like) and receiver combiners (which are also commonly known as receive filter, spatial receive filters, analog combiner, and the like) in TDD MIMO communications systems. In BIT, neither device (a transmitting device or a receiving device) participating in BIT may have a priori knowledge of CSI, especially detailed information about the channel such as channel matrix H or covariance matrix of the channel, wherein the channel may be one between a UE and its serving access node(s) or one between the UE and its interfering access node(s) (which generally requires information exchanges among access nodes, such as channel information about an interfering link or RS information so that the UE or access node can estimate the interfering link).

An iterative form of BIT consists of forward training (e.g., in a downlink direction) and backward training (e.g., in an uplink direction) that is repeated until convergence is achieved. A one-shot form of BIT comprises a single forward training step and a single backward training step. In general, BIT is capable of adapting to unknown interference and can suppress interference without any channel estimation or CSI feedback, thereby making BIT less sensitive to the orthogonality of training sequences. A more detailed discussion of BIT is presented in co-assigned patent application entitled "System and Method for Communications System Training," application Ser. No. 15/983,692, filed May 18, 2018, which is hereby incorporated herein by reference in its entirety.

Uplink probing involves the estimation of uplink channels between the access node and UEs served by the access node after reception of the uplink SRS, which reflects the interference situation at neighboring cells.

The cooperative MIMO scheme for interference probing and suppression requires some limited semi-static access node coordination but no instantaneous coordination or information exchange among the access nodes. One way to implement the scheme, also referred to as BIT, is as follows:

a) Coordination Stage:

Access nodes semi-statically coordinate a common probing delay (e.g., the time gap between SRS probing and PDSCH transmission) and common SRS probing resources (e.g., set aside 1 or more OFDM symbols for UEs to send A-SRS for probing), where the term common means being common to all cooperating access nodes.

b) Execution stage without instantaneous inter-access node coordination or information exchange:

b1. Access node pre-scheduling—each access node schedules its PDSCH transmissions separately;

b2. A-SRS triggering—each access node separately triggers its scheduled UEs for A-SRS transmissions, and the A-SRS at least has the same FDRA as the scheduled PDSCH;

b3. A-SRS transmission—UEs transmit A-SRS, which, by access node coordination, are on the SRS probing resources;

b4. PDSCH precoding adjustment—each access node separately estimates interference on the SRS probing resources and adjusts PDSCH precoding for each of its scheduled UE;

b5. PDSCH transmission—each access node transmits the scheduled PDSCH with adjusted precoding on a slot according to the coordinated probing delay after the SRS probing resources.

The interference on the SRS probing resources carries information that can reflect an instantaneous DL interference (i.e., associated with one-time scheduling outcomes) and can be useful for PDSCH precoding adjustment to suppress DL interference. Therefore, no instantaneous coordination, information exchange, or knowledge of other cells' UEs is needed.

FIG. 3 illustrates a flow diagram of operations 300 occurring in an interference probing process. Operations 300 may be indicative of operations occurring in an interference probing process involving an access node and one or more UEs.

Operations 300 begin with the one or more UEs transmitting uplink SRSs (block 305). The uplink SRSs may be transmitted by active UEs that are configured by the access node, and may be used for uplink channel estimation of the uplink channels between the configured UEs and the access node. In addition to being used for uplink channel estimation, the uplink SRSs may be used by the access node to select UEs for prescheduling. As discussed previously, prescheduled UEs are UEs selected by the access node, from of the access node's configured UEs, to transmit trigger based uplink SRSs, which are used by the access node to determine downlink precoders. In an embodiment, the uplink SRSs transmitted by the UEs in block 305 may be unprecoded. In an embodiment, instead of the uplink SRSs, feedback transmitted by the UEs is used by the access node to select UEs for prescheduling. The access node performs uplink channel estimation (block 307). The estimation of the uplink channels is performed using the uplink SRSs transmitted by the UEs, for example. As an example, the access node makes measurements of the uplink SRSs, and determines the estimates of the uplink channels based on the measurements of the uplink SRSs and the knowledge of the uplink SRSs. Alternatively, the estimation of the uplink channels is performed using the feedback transmitted by the UEs.

The access node preschedules the UEs (block 309). The access node may preschedule UEs based on the uplink SRSs or feedback received from the UEs. As an example, the access node selects the UEs associated with the uplink SRS (or feedback) received with highest signal quality measure. Examples of signal quality measures include signal to interference plus noise ratio (SINR), signal to noise ratio (SNR), reference signal received power (RSRP), reference signal received quality (RSRQ), received signal power, and so on. The access node may select the UEs associated with uplink SRSs received with signal quality measures that exceed a specified threshold. The specified threshold may be specified in a technical standard, an operator of the communication system, or through collaboration between the access node and the UEs, for example. The access node may select a specified number of UEs associated with uplink reference signals received with signal quality measures that exceed a specified threshold. The specified number may be specified in a technical standard, an operator of the communication system, or through collaboration between the access node and the UEs, for example. As an example, the access node may preschedule UEs based on the channel quality indicator (CQI) of the uplink channels, or the precoding matrix indicator (PMI) associated with the UEs.

The access node transmits downlink control information, e.g., in a downlink control information (DCI), intended for the prescheduled UEs to trigger SRS transmission with specific parameters and to assist UEs in the measurement (e.g., use) of the downlink ports. The downlink control information may provide to the prescheduled UEs the SRS parameters, as well as related downlink associations. In other words, the downlink control information configures the SRS parameters and the related downlink associations. The downlink control information may indicate to the prescheduled UEs which of the downlink channel state information reference signal (CSI-RS) are assigned to the prescheduled UEs for proper measurement and determination of downlink combiner and/or uplink precoder. In an embodiment, the DCI may be group based DCI addressing a group of UEs (e.g., all of active UEs or a subset of active UEs). In another embodiment, the DCI may be unicast DCI (such as 5G NR DCIs) addressed to a UE. The DCI (in either case) includes modified or added fields that signal the SRS parameters.

The access node may transmit CSI-RSs (block 311). The CSI-RSs (if the access node is to transmit the CSI-RSs) may be transmitted in a precoded or unprecoded manner. The UEs may perform downlink channel estimation (block 313). In situations where the access node transmits the CSI-RSs, the UE performs downlink channel estimation in accordance with the received CSI-RSs. In an embodiment, only the UEs that received the downlink control signals (i.e., the prescheduled UEs) perform downlink channel estimation.

The prescheduled UEs transmit triggered uplink SRSs (block 315). The prescheduled UEs transmit the uplink SRSs as configured by the downlink control signals. In an embodiment, the uplink SRSs are precoded or are unprecoded (with no information contained therein). The uplink SRSs are transmitted in accordance with the SRS configuration. As an example, a prescheduled UE transmits its uplink SRS in configured SRS resources, over configured transmission ports, using configured subbands, combs, and cyclic shifts, and with configured transmission bandwidth, as configured by the downlink control signals.

The configuration of the SRS parameters such as the SRS resource sets (SRS resources within a set), SRS transmission bandwidth, SRS transmission ports, SRS transmission comb and cyclic shift, etc., may be performed using higher layer configuration. Arrangements of SRS resources or ports may be defined by the network and the network may configure the UEs with the different arrangements. In addition, the network may configure the UEs with a different mappings (e.g., relationships, associations) between downlink ports, layers, reference signals (such as demodulation reference signals (DMRS), CSI-RS), and uplink port or layers (SRS).

An important factor in supporting BIT and various SRS enhancements is to increase the flexibility of A-SRS triggering, for at least the following motivations, in addition to the BIT related motivations. That is, the flexible A-SRS triggering may be designed and used beyond BIT applications.

Limited triggering information in existing DCIs (1, 2, or 3 bits only): SRS transmissions are associated with many parameters, such as comb, cyclic shift, transmission bandwidth in terms of the number of PRBs, on UL or SUL of a serving cell, antenna port(s), etc. In existing standards, A-SRS can be triggered via a SRS request field in a DCI, and the field may include 1, 2, or 3 bits. These bits can indicate 1) certain indicated SRS resource set(s) of the current serving cell, or 2) SRS resource set(s) on certain indicated serving cells, or 3) one of the UL and SUL. However, many other SRS transmission parameters cannot be indicated in DCI and can only be specified in RRC configuration signaling. For example, because of the DCI bitwidth limitation, the network may have to configure a few SRS resource sets together or configure a few serving cells together, i.e., these sets have to be triggered together, which is typically highly undesirable. In general, the limited triggering information leads to lack of flexibility in many applications as outline below, and hence it is a motivation to improve the A-SRS triggering flexibility.

Lack flexibility in triggering offset (delay): In existing standards, the A-SRS triggering offset is configured via RRC field slotOffset and can range from 1~32 slots, and if this field is not configured, then 0 slot offset is applied. This can be limiting in several cases. For example, when using the group-common (GC) DCI format 2_3 to trigger SRS for a group of UEs on one or more of their serving cells, all the SRS transmissions are to occur after their pre-configured offsets with respect to the same DCI triggering slot. This may impose significant restriction on network's decision on which slot to send the GC DCI. For another example, SRS triggering by a DL DCI is likely to collide with the acknowledgement or negative acknowledgement (A/N) associated with the DL DCI, and SRS triggering by a UL DCI is likely to collide with the PUSCH associated with the UL DCI, especially in TDD communications systems when the UL slots occur less frequently. In general, the main purpose of A-SRS triggering is to provide flexibility in SRS timing, but the pre-determined timeline in the triggering offset along with the mostly fixed slot structure cannot serve that purpose well. Enhancements are therefore needed.

Various vital roles of A-SRS: The A-SRS plays vital roles in TDD DL full MIMO CSI acquisition, TDD or FDD UL CSI acquisition, frequency range 2 (FR2) beam management, frequency-selective scheduling, UL timing advance (TA) maintenance, positioning, etc. As also considered in 3GPP work items (WI), it is also crucial for FDD DL performance. However, the lack of flexibility described above regarding SRS triggering limits the usefulness of the SRS. For instance, if the SRS is dropped due to collisions caused by inflexibility in triggering offset described above, then CSI acquisition and frequency-selective scheduling may be negatively impacted. CSI acquisition and frequency-selective scheduling can be highly dynamic and therefore periodic or semi-periodic SRSs (P/SP-SRSs) are not suitable. In LTE Rel-14 SRS carrier-based switching, autonomous A-SRS retransmission is introduced so that a dropped A-SRS triggered by a DL DCI (i.e., after colliding with A/N) would be autonomously retransmitted in the next configured SRS transmission occasion, but this feature is not yet supported in 5G NR. To make P/SP-SRSs and A-SRSs complement each other, P/SP-SRSs can be configured with long periodicities (to avoid excessive overhead and complexity) and the network relies on the A-SRS for fast response to changes in traffic load and CSI (especially dynamic interference). Therefore, flexible A-SRS triggering can be beneficial in many cases due to various vital roles played by the A-SRS and should be supported.

Tightly related to SRS capacity or coverage enhancements: SRS coverage or capacity enhancements may include, but not limited to: 1) SRS capacity enhancement via SRS on partial bandwidth, for which the bandwidth may be dynamically indicated via DCI; 2) SRS capacity enhancement via SRS transmissions on unused PRBs or symbols in the PUSCH or PDSCH region, for which the SRS time-frequency resources may be dynamically indicated via DCI on the fly based on unused resources of a transmission time interval (TTI); 3) SRS capacity enhancement via SRS multiplexed (on the same symbol) with other signals, e.g., A/N, to accommodate flexible SRS multiplexing to maximize SRS capacity; 4) SRS coverage enhancements via narrowband transmission based on frequency selectivity (rather than pre-configured PRBs), and so on. Some of the enhancements are also applicable to P/SP-SRS, however, especially for capacity enhancement, the SRS needs to have sufficient flexibility, e.g., when the network identifies a chance for A-SRS to opportunistically fill a gap in time-frequency resources (e.g., an unoccupied symbol in a slot, a few unoccupied PRBs, etc.) it would trigger the UE to perform the A-SRS transmission. Therefore, flexible triggering of A-SRS can be also useful to SRS capacity or coverage enhancements.

In order to effectively convey information about dynamic interference conditions to the network, an access node can indicate to UEs how the SRS should be transmitted, including the time or frequency resource allocation and port selection for the SRS corresponding to the prospective PDSCH. This means that the network needs to dynamically adjust more SRS transmission parameters (PRB allocations, port selection, etc.) than with conventional SRS transmissions. Embodiments are provided for SRS transmission with parameters tied to DL transmission, including PRB allocation and port allocation.

In an embodiment, an indication of A-SRS PRB/port allocation is provided. The SRS PRB/port allocation should be the same as the prospective PDSCH and should be dynamically indicated.

In an embodiment, an A-SRS beamforming indication is provided. The SRS beamforming can be based on DL channel measurement resources (CMRs), and to better reflect potential DL interference, it is more desirable to be based on DL CMRs and interference measurement resources (IMRs), one or both of which may be dynamically indicated. In an embodiment, an A-SRS triggering offset is provided. In order to utilize the A-SRS to estimate the interference for interference mitigation via precoding adjustment, the access nodes may not need to detect each UE's SRS sequences. The received SRS power accumulated on each access node's receiving antenna port should be sufficient. Thus, the A-SRS can be transmitted on overlapping resources to reduce overhead. However, the A-SRS triggers may be sent to different UEs at different times. In order to enable A-SRS overlap, the A-SRS triggering offsets may be dynamically indicated to different UEs. The A-SRS triggering offset may be similar to the k0 offset and start and length indicator value (SLIV) design for PDSCH, for example. In order to further reduce overhead, k0 and SLIV may not refer to the absolute slot or symbol offsets but slot or symbol offsets based on configured SRS slots or symbols.

In an embodiment, a higher priority for A-SRS with newly introduced flexibility is provided. The A-SRS with newly introduced parameters in a SRS request field supports BIT and other enhancements may be assigned with higher priority, so that when the A-SRS collides with other SRS or UL transmissions, the other transmissions (i.e., the transmissions colliding with the A-SRS) are dropped.

In an embodiment, after the reception of the uplink SRS, access nodes preschedules UEs and indicates to the pre-scheduled UEs through the signaling of parameters, including which portion of the SRS transmission bandwidth, which SRS resources or ports from the different SRS resources or ports arrangements, transmission comb, cyclic shift, and which of the downlink CSI-RS ports (and/or DMRS) are assigned to the prescheduled UEs. In addition to the listed parameters, the indication signaled to the prescheduled UEs may include an association (e.g., mappings, relationships) between the uplink ports, the downlink ports, or bandwidth. The downlink ports may consist of the DMRS or CSI-RS ports. In an embodiment, the network uses a group DCI message to dynamically configure the SRS parameters. In another embodiment, a unicast DCI message is used to dynamically configure the SRS parameters. The SRSs transmitted by the prescheduled UEs may be referred to as triggered SRS to differentiate them from the uplink SRSs that are transmitted by the UEs to facilitate uplink channel estimation, such as discussed in block 305 of FIG. 3. The uplink reference signals (e.g., the SRSs) are used to convey interference situation in the neighboring cells, as well as the serving access node's accounting of the interference suppression receiver capability of the UE. Subsequently, the access node determines the downlink precoder (in accordance with the received precoded SRSs (i.e., the triggered SRSs), for example) and transmits downlink data utilizing the downlink precoder.

The following discussion provides additional details on the indication of the SRS transmission parameters.

As related to signaling the SRS Resources or Ports, the network indicates to the UEs which of the SRS resources or ports are assigned to the UEs. In other words, the UE needs to know which resource of the SRS resource pool or subset of the SRS configured resources to transmit on in the uplink transmission of the precoded SRSs.

In an embodiment, the network configures the UE with different arrangements of resources or ports. The different arrangements of the resources or ports may differ by the cyclic shift, transmission comb, number of symbols (e.g., orthogonal frequency division multiplexed (OFDM) symbols), etc., for example. The different arrangements represent different mechanisms the network may pack the UEs SRS resources or ports. In an embodiment, the different resources or ports arrangements are predefined. Signaling a predefined arrangement of resources or ports may require less overhead than signaling the different values for the cyclic shift, transmission comb, number of symbols (e.g., OFDM symbols), etc. As an example, if there are 8 predefined arrangements, signaling any one of the 8 may be accomplished by signaling a 3-bit index, while signaling the different values may require significantly more than 3 bits. The predefined arrangements may be defined in the 3GPP standard or be higher layer configured, the network may downsize (further select and signal) a particular configuration after prescheduling (or scheduling) and may signal the downsized arrangement to the UE using DCI, for example.

As an illustrative example of SRS resource or port signaling, consider a communication system with 8 type 1 demodulation reference signal (DMRS) ports. In an embodiment, 12 DMRS ports may be used as an illustrative example, with a total of 8 uplink SRS resources (e.g., ports) for all UEs operating within a single cell and that 8 UEs are prescheduled. There is a need for the UEs to know which of the 8 uplink SRS resources to transmit on. Therefore, there is a need to signal, to the UEs to inform the UE which uplink SRS resource (or resources) to use, in an efficient way that minimizes impact on overall communication system performance. Informing the UEs which uplink SRS resources to use may involve indicating which comb, symbol, cyclic shift, number of OFDM symbols, etc., to use. As discussed previously, in one embodiment, the UEs may be configured with different arrangements of these SRS resources or ports. These arrangements may be specified in a technical standard, by an operator of the communication system, or determined through collaboration between communicating devices, for example. Example arrangements include:

1 physical resource with 8 ports for 8 UEs having cyclic
    shift 8 (for orthogonality between ports) and comb 2;
  1 physical resources with 8 ports for 8 UEs having cyclic
    shift 8 and comb 4;
  8 physical resources with 1 port for each of the 8 UE;
  2 physical resources with 4 ports per resources using
    cyclic shift 4

In a first example embodiment, there is 1 physical resource with 8 ports for the 8 UEs served within the cell, with a cyclic shift of 8 (ensuring orthogonality of SRS transmission), a comb of 2, and repetition over a specified number of symbols (the specified number of symbols may be specified in a technical standard, by an operator of the communication system, or determined through collaboration between communicating devices, for example). In order to indicate to the UEs which one of the 8 resource arrangements to use, a 3-bit indication is sufficient.

In a second example embodiment, there is 1 physical resource with 8 ports for the 8 UEs operating within the cell, with a cyclic shift of 8, and a comb of 4. In order to indicate to the UEs which one of the 8 resource arrangements to use, a 3-bit indication is sufficient.

In a third example embodiment, there are 8 physical resources with 1 port per physical resource for each UE operating within the cell, with OFDM symbol multiplexing. In order to indicate to the UEs which one of the 8 resource arrangements to use, a 3-bit indication is sufficient.

In a fourth example embodiment, there are 2 physical resources with 4 ports per physical resource for each UE operating within the cell, with a cyclic shift of 4. In order to indicate to the UEs which one of the 8 resource arrangements to use, a 4-bit indication is sufficient if some UEs are allocated more than one port, e.g., a UE may be allocated 2 ports.

These different resource or port arrangements may be predefined and the network may configure the UE with the different arrangement. The network may signal one or more of these arrangements using DCI for the subset of (prescheduled, scheduled, active) UEs.

The examples presented above are only examples of resource configuration and the actual configuration may not be limited to the aforementioned resource configurations. In this case the network may use a certain number of bits (for example 3 to 4 bits) in the DCI to indicate to the UE which of the arrangements of resources or ports (implicitly indicating the transmission layers, comb and cyclic shift) is assigned to the UE.

In an embodiment, the network may define a full set of SRS resources or ports and use an indication to indicate a subset thereof. Such a design is similar to the DMRS port indication in 5G NR. In another embodiment, the network may define the subset of SRS resources or ports and use the indication to indicate the subset of the configured subsets. In any of these embodiments, a table may be used to summarize all the possible resources set or subsets with the ports (ranks) which may be tied to the cyclic shift, comb, OFDM symbols, offset, etc.

The network may define a DCI bit indication that may have a one to one mapping to the port indication of the SRS which may be tied to the cyclic shift, comb, offset, OFDM symbols. The value indicated in the DCI bit indication would map to the ports that may be used for SRS transmission. In one embodiment, one port may be used such as port 0. In another embodiment, multiple ports may be used (e.g., two ports may be used for SRS transmission). The field may be referred to as antenna ports and number of layers for SRS and a fixed number of bits may be used in the DCI to indicate it. This DCI bit indication may be referred to as a spatial domain resource assignment (SDRA).

In another embodiment, the access node transmits configuration information of a plurality of SRS resources to a UE. The configuration information includes a plurality of SRS resource sets to the UE, each SRS resource set comprising one or more SRS resources. The access node then transmits to the UE, an indication of one of the plurality of SRS resource set.

The antenna ports to be used for SRS transmission may be determined according to an ordering of the SRS ports specified by the predefined configuration. The predefined configuration may be represented by tables. The number of bits, which are indicated in the DCI as defined by the group arrangements, indicates the ports of transmission which are tied to physical resources such as cyclic shift, comb, OFDM symbols, offset, etc.

In the situation where a group DCI is used to convey the SRS configuration, the indication of the layers or ports assigned for a UE within the pre-defined SRS port resources is possible. As an example, for each cell (e.g., sector, transmission point, etc.), a predefined number of SRS port resources is assigned, such as, 8 or 12 ports, for example. In the group DCI, the network indicates the layers or ports assigned for a UE within the predefined SRS port resources. For example, the network has configured a SRS resource for all active UEs in the cell, and the SRS resource has the same 8 ports. The group DCI indicates which of the 8 ports are allocated for the particular UE. The pre-defined SRS port resources may be specified in a technical standard specification, or signaled from the network to the UE via a RRC configuration signaling, a MAC signaling, and in some embodiments, a DCI. For example, the RRC signaling configures the SRS port resources with indexes 0~7 as being assigned for UE1 as UE1's SRS ports 0~7, SRS port resources with indexes 0~7 as being assigned for UE2 as UE2's SRS ports 0~7, SRS port resources with indexes 8~15 as being assigned for UE3 as UE3's SRS ports 0~7, SRS port resources with indexes 8~15 as being assigned for UE4 as UE4's SRS ports 0~7, etc.

This design can also be adopted for UE-specific DCI (such as DCI format 1-1, an enhancement of 1-1 (which is discussed in detail below), etc.) for A-SRS triggering. The DCI may have an antenna port indication field for the A-SRS, which (in some embodiments) may also be used for antenna port indication for PDSCH, and the UE maps the ports indicated in the field to the pre-defined SRS port resources assigned to the UE. For example, UE1 may receive an enhanced DCI of DCI format 1-1 with the antenna port indication field for both PDSCH and SRS indicating value 25 (as in Table 7.0.1.2.2-2 of TS 38.212 v16.2.0, (shown below); for dmrs-Type=1, maxLength=2, which are also signaled to the UE for PDSCH) which corresponds to PDSCH DMRS ports 2 and 6 as well as SRS ports 2 and 6, which is further mapped to SRS port resources 2 and 6, another example, UE3 may receive an enhanced DCI of DCI format 1-1 with the antenna port indication field for both PDSCH and SRS indicating value 25 which corresponds to PDSCH DMRS ports 2 and 6 as well as SRS ports 2 and 6, which is further mapped to SRS port resources 10 and 14.

As an example, consider a communication system with 4 UEs, the network may assign the first port for a first UE, two subsequent ports for the second UE, etc. In another embodiment, the network may reuse DMRS port mapping or CSI-RS port mapping.

In one embodiment, the SRS resource is configured for all resource block groups (RBGs) but the scheduling or group DCI allows different UEs be scheduled on different RBGs.

The UE identifiers are used to reduce DCI signaling overhead. In an embodiment, to further reduce DCI size, unique but short UE identifiers are assigned to the prescheduled UEs. Instead of using long UE identifiers, such as a radio network temporary identifier (RNTI), which may be 10 or more bits long, short UE identifiers that are unique within the prescheduled UEs are assigned to each prescheduled UE. As an example, if there is a maximum of 16 prescheduled UEs, then the short UE identifier may be as short as 4 bits, while if there is a maximum of 8 prescheduled UEs, then the short UE identifier may be as short as 3 bits. In an embodiment, the short UE identifier may be allocated by the access node and signaled to the prescheduled UEs using RRC messaging, MAC CE messaging, higher layer messaging, and so on.

The UE identifiers of the prescheduled UEs may be indicated in the DCI. The access node may send a DCI trigger to the prescheduled UEs. The indication of the prescheduled UEs may be included in a dedicated field of the DCI. Additionally, the UE identifiers and the UE identifier field in the DCI may be configured using higher layer signaling.

TABLE 7.3.1.2.2-2 FROM OF TS 38.212 V16.2.0

| Antenna port(s) (1000 + DMRS port), dmrs-Type = 1, maxLength = 2 | | | | | | | |
| One Codeword: Codeword 0 enabled, Codeword 1 disabled | | | | Two Codewords: Codeword 0 enabled, Codeword 1 enabled | | | |
| Value | Number of DMRS CDM group(s) without data | DMRS port(s) | Number of front-load symbols | Value | Number of DMRS CDM group(s) without data | DMRS port(s) | Number of front-load symbols |
|---|---|---|---|---|---|---|---|
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

With the use of UE identifiers, prescheduled UEs are able to decode the DCI that is identified using the UE identifier. Those prescheduled UEs that are able to decode the DCI identified with their UE identifiers are considered to be the triggered UEs. UEs which are configured but not triggered may also attempt to decode the DCI, but these UEs would fail because the DCI is not addressed to them, and hence they are not triggered UEs.

As new UEs are prescheduled or additional sets of active UEs are present, the UE identifiers may be renewed and reconfigured, possibly through higher layer configuration, for example.

As discussed previously, there may be an association between the SRS and the DL Reference Signals. In order for a UE to receive precoded (or unprecoded) CSI-RS, the UE needs to know which CSI-RS ports have been allocated, therefore, a CSI-RS port indication needs to be sent to the UE. After the UE receives the CSI-RS port indication, the UE may be able to infer (from the CSI-RS port indication, for example) the preconfigured CSI-RS ports to use to measure the downlink channel and the SRS ports to transmit the SRS because the SRS resource and CSI-RS resource are already preconfigured and there is an association between the SRS and the CSI-RS resources.

Similarly, a UE needs to know which of DMRS ports have been allocated for it. A DMRS port indication needs to be sent to the UE. After the UE receives the DMRS port indication, the UE may be able to infer (from the DMRS port indication, for example) the preconfigured DMRS ports to use to measure the downlink channel and the SRS ports to transmit the SRS because the SRS resource and DMRS resource are already preconfigured and there is an association between the SRS and DMRS resources.

In one embodiment, the SRS indication field which is used to signal the specific arrangement of SRS resources or ports is also used to indicate to the UE a mapping between the uplink and downlink ports (such as DMRS or CSI-RS ports). Because the SRS ports of each UE are identified, the UE may infer the associated ports in the downlink from the configuration (e.g., the mapping). In such a case, the associated relationship between the uplink and downlink ports may be configured through higher layer configuration. A fixed mapping may be defined that can identify the association, for example, a one to one mapping between the uplink and downlink ports may be configured. In another embodiment, a permutation between the uplink and downlink ports may be applied as a mapping. The permutation may be specified in a technical standard, by an operator of the communication system, or through collaboration between the network and the UE. Hence, the permutation is known by both the network and the UE. As the UE determines the SRS ports or layers indicated to the UE, the UE may measure the corresponding CSI-RS or DMRS for channel estimation and use the measurement to determine the precoder for precoding of the uplink SRS.

In one embodiment, the indication is implicit. In this case, signaling the SRS resources or ports may be sufficient to signal the association due to the fixed mapping between the resources. In another embodiment, the indication is explicit. In this case, a dedicated field that explicitly identifies the downlink CSI-RS, or DMRS for the scheduled UEs may be used.

DCI may have dedicated field to indicate the DMRS-SRS association. It may also have field to indicate the CSI-RS-DMRS association. A table may be defined in the specification that has a one to one mapping of the uplink port with the downlink ports, for example.

The number of bits used to indicate the association between the downlink port(s) and SRS port(s) may be used for indication of the transmission of one of more downlink ports and the SRS ports which may be indicated by the SRS resources or ports indication fields.

In an embodiment the association is used to indicate not only the port association but also the bandwidth association (e.g., the active BWP).

In addition to the above mentioned parameters (e.g., UE identifier, an association, and the SRS resources indication), the Group DCI may include some or all of the following:

A resource allocation field that indicates the time and frequency resources (resource block groups for UEs, for example), An explicit indication of CSI-RS or DMRS ports using dedicated fields in the DCI that may signal the downlink ports. The explicit indication may also be used by the UE to determine the rank of the transmission. In an embodiment, the UE may infer the rank of transmission in the uplink based on the downlink reception.

A transmit power command used for SRS transmission power control.

FIGS. 4 and 5 illustrate diagrams 400 and 500 of RGBs 405, 407, 505, and 507, and example mapping of SRS resources and ports. Diagram 400 illustrates RGBs 405 and 407 in a communication system with the following configuration: assume DMRS type 1 (8 ports per RGB per cell for all paired UEs); in another embodiment 12 port DMRS may be considered, and the 8 ports are associated with 8 SRS port resources, selected from n available port resources (e.g., for comb 4, n=48, and for comb 2, n=16). The SRS port resources may be arranged in a manner similar to those illustrated for RBG1 405 and RBG2 407, and each port resource may be assigned with a global index such as (2, 9) representing (COMB shift=2, cyclic shift=9), i.e., the global indexing may be the same for different RBGs, or (1, 2, 9) representing (RBG=1, COMB shift=2, cyclic shift=9), i.e., RBG specific indexing. In some embodiments, instead of RBGs, other time or frequency resource groups can be used, such as (RBG, OFDM symbol), PRB, every 4 RBGs, etc. The SRS from neighboring cells should be multiplexed on the n SRS port resources. In order to indicate, to a UE, which 1, 2, or 4 SRS port resources out of the available n SRS port resources would require more bits than available in a DCI message.

Diagram 500 illustrates RGBs 505 and 507, with the same configuration as discussed in FIG. 4. In an embodiment, UE-group CSI-RS or DMRS design is applied to the SRS. For each cell, there are only 8 predefined SRS port resources (shown in FIG. 5 as different shaded and patterned blocks in the SRS port resources region of the RGBs). Then, in a DCI message (such as a group DCI message or a UE-specific DCI message), the layer or port assignments for a UE are made within the 8 predefined SRS port resources and indicated accordingly. As an example, configure a SRS resource for all active UEs in cell 1 (shown as unshaded blocks in the SRS port resources region of the RGBs of FIG. 5), and the SRS resource has the same 8 ports. That is, SRS port(s) indicated to a UE configured with the SRS port resources will be mapped to the SRS port resource(s) in a one-to-one fashion. The group DCI message indicates which of the 8 ports are allocated to a particular UE. As an example, rank [1, 2, 4, 1] are signaled for UEs 1, 2, 3, and 4, respectively, without needing to indicate the layer index.

As another example, the DMRS port mapping of the resources are used. The SRS resource is configured for all RGBs, but the scheduling or group DCI allows different UEs to be scheduled on different RGBs. In an embodiment, a UE (or a cell) is assigned with SRS port resources not consecutive as shown in FIG. 5, that is, a UE in CELL1 may not be assigned with COMB shift=1 and cyclic shifts from 1 to 12. Instead, the ports resources for the UE is distributed (spread out) in the figure, such as (COMB shift=1, cyclic shift=1), (COMB shift=1, cyclic shift=7), (COMB shift=2, cyclic shift=1), (COMB shift=2, cyclic shift=7), (COMB shift=3, cyclic shift=1), (COMB shift=3, cyclic shift=7), (COMB shift=4, cyclic shift=1), and (COMB shift=4, cyclic shift=7). An advantage is that the ports for one UE or one cell are more spread out over the potential SRS port resources, reducing the potential interference or overlap between cyclic shifts that are close to each other.

Alternative designs to the Group DCI for signaling control information of the SRS are possible. In one embodiment, the UEs identified in a Group DCI share a resource allocation field (e.g., Type 0 or Type 1 indication). Such a case may occur in a multi-user multiple input multiple output (MU-MIMO) setting, where UEs may share resource blocks or RBGs. In this situation, preconfigured UEs which are not prescheduled have fields in the Group DCI with trigger set to zero.

In another embodiment, the UEs identified in a Group DCI have separate fields for the indication of the resource allocation fields for each of the UEs. In this case, preconfigured UEs which are not prescheduled have fields with trigger set to zero.

In any of the preceding embodiments, a UE identifier may be used to identify prescheduled UEs. In this way, only prescheduled UE are able to decode the DCI. However, any UE may attempt to decode the DCI to check if it is triggered (prescheduled) or not. For example, all UEs detecting the DCI can attempt to decode the DCI.

In any of the preceding embodiments, the DCI includes a combination of fields listed or subset of the fields aforementioned.

In another embodiment, a modified DCI format, such as DCI format 0_1 (UL Grant) or DCI format 1_1, may be used to dynamically configure triggered (i.e., prescheduled UEs) with the SRS parameters aforementioned and the associated downlink PDSCH or CSI-RS parameters.

Any of the 5G NR DCI designs may be used to signal the necessary aforementioned fields, such as the necessary fields added or modified to the DCI.

Figure 6:
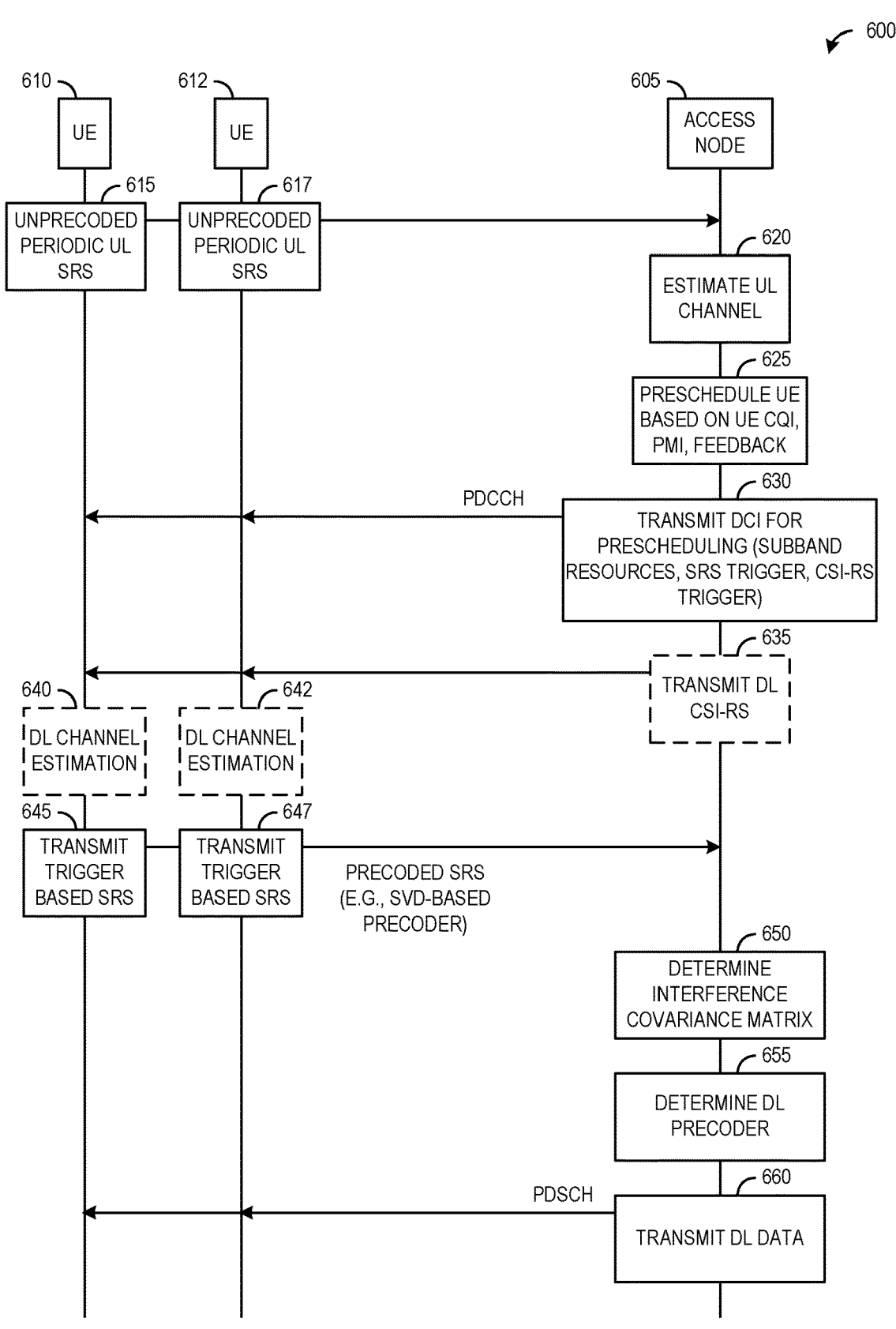
FIG. 6 illustrates a diagram of messages exchanged by communicating devices performing interference probing according to example embodiments presented herein.

FIG. 6 illustrates a diagram 600 of messages exchanged by communicating devices performing interference probing. Diagram 600 displays messages exchanged by an access node 605 and UEs 610 and 612 as the communicating devices perform interference probing (may also be referred to as training or BIT).

UEs 610 and 612 transmit uplink SRSs (blocks 615 and 617). The uplink SRSs may be unprecoded and periodic, for example. The uplink SRSs are transmitted to access node 605. Access node 605 estimates the uplink channels (block 620). The estimation of the uplink channels is made in accordance with the uplink SRSs transmitted by the UEs. Access node preschedules UEs (block 625). The prescheduling of the UEs may be in accordance with the signal quality measures, CQI, PMI, or feedback, as discussed previously. In the example shown in FIG. 6, UEs 610 and 612 are also the prescheduled UEs. Although the example shown in FIG. 6 illustrates the situation where both UEs transmitting uplink SRSs are prescheduled by the access node, in general, a subset of the UEs transmitting uplink SRSs are prescheduled by the access node.

Access node 605 transmits control information configuring uplink SRSs for the prescheduled UEs (block 630). The control information may be transmitted in group DCI or unicast DCI, for example. The group DCI may contain the UE identifiers of the prescheduled UEs in one embodiment. The control information may include (a subset thereof is also possible) configuration information for UEs, such as, transmission bandwidth of the uplink SRS, or a portion of the transmission bandwidth, an indication of the transmission ports of the uplink SRS, an indication of the SRS resources or ports of the uplink SRS, an implicit or explicit indication of the cyclic shift and comb, the subbands of the uplink SRS, SRS trigger, CSI-RS trigger, DMRS trigger, a mapping between the CSI-RS and SRS, an indication of the mapping between the DMRS and SRS, etc.

If access node 605 is to transmit CSI-RS, access node 605 transmits the CSI-RS (block 635). UEs 610 and 612 may perform downlink channel estimation (blocks 640 and 642). The downlink channel estimation may be performed in accordance with the CSI-RS transmitted by access node 605. If access node 605 does not transmit the CSI-RS, UEs 610 and 612 may not perform downlink channel estimation. If access node 605 does transmit the CSI-RS, one or both of UEs 610 and 612 (as well as other UEs served by access node 605) may perform downlink channel estimation. In other words, not all UEs served by access node 605 perform downlink channel estimation, even with access node 605 transmitting the CSI-RS.

UEs 610 and 612 transmit uplink SRS (blocks 645 and 647). The uplink SRS are transmitted in accordance with the configuration information transmitted by access node 605. The uplink SRS may be precoded, e.g., single value decomposition (SVD) based precoder is used to precode the uplink SRS. Access node 605 determines interference covariance matrices (block 650). The interference covariance matrices are determined based on the uplink SRS transmitted by UEs 610 and 612 (i.e., the prescheduled UEs). Access node 605 determines downlink precoders (block 655). The downlink precoders are determined in accordance with the interference covariance matrices. Access node 605 transmits downlink data to UEs 610 and 612 (block 660). Access node 605 precodes the downlink data for each prescheduled UE using the downlink precoder associated with the prescheduled UE, for example. The precoded downlink data is transmitted over a physical downlink shared channel (PDSCH), for example.

In the 3GPP 5G NR standards related to existing DCI formats, the DCI size is minimized in order to reduce communications overhead. As an example, in the DCI format 2_3, used for transmitting group transmit power control (TPC) commands for SRS transmissions by one or more UEs, the DCI size is less than or equal to the DCI size of DCI format 1_0. Therefore, the number of bits available to transmit the uplink SRS configurations is limited. However, existing DCI formats do not support dynamic signaling of SRS configuration. Additionally, control information has to be provided for all configured UEs, even those that are not triggered (i.e., UEs other than the prescheduled UEs) to transmit the uplink SRS, therefore, the number of UEs configured using the existing DCI formats is limited due to the limitation of the number of bits.

According to an example embodiment, a DCI format for conveying SRS configuration information is provided. In an embodiment, the DCI includes SRS configuration information only for the prescheduled UEs. Existing DCI formats include control information for all configured UEs, even those that are not prescheduled. Having the DCI include only SRS configuration information for the prescheduled UEs reduces the size of the DCI, thereby permitting a reduction in the DCI size or an inclusion of more SRS configuration information in the same sized DCI.

Figures 7, 8:
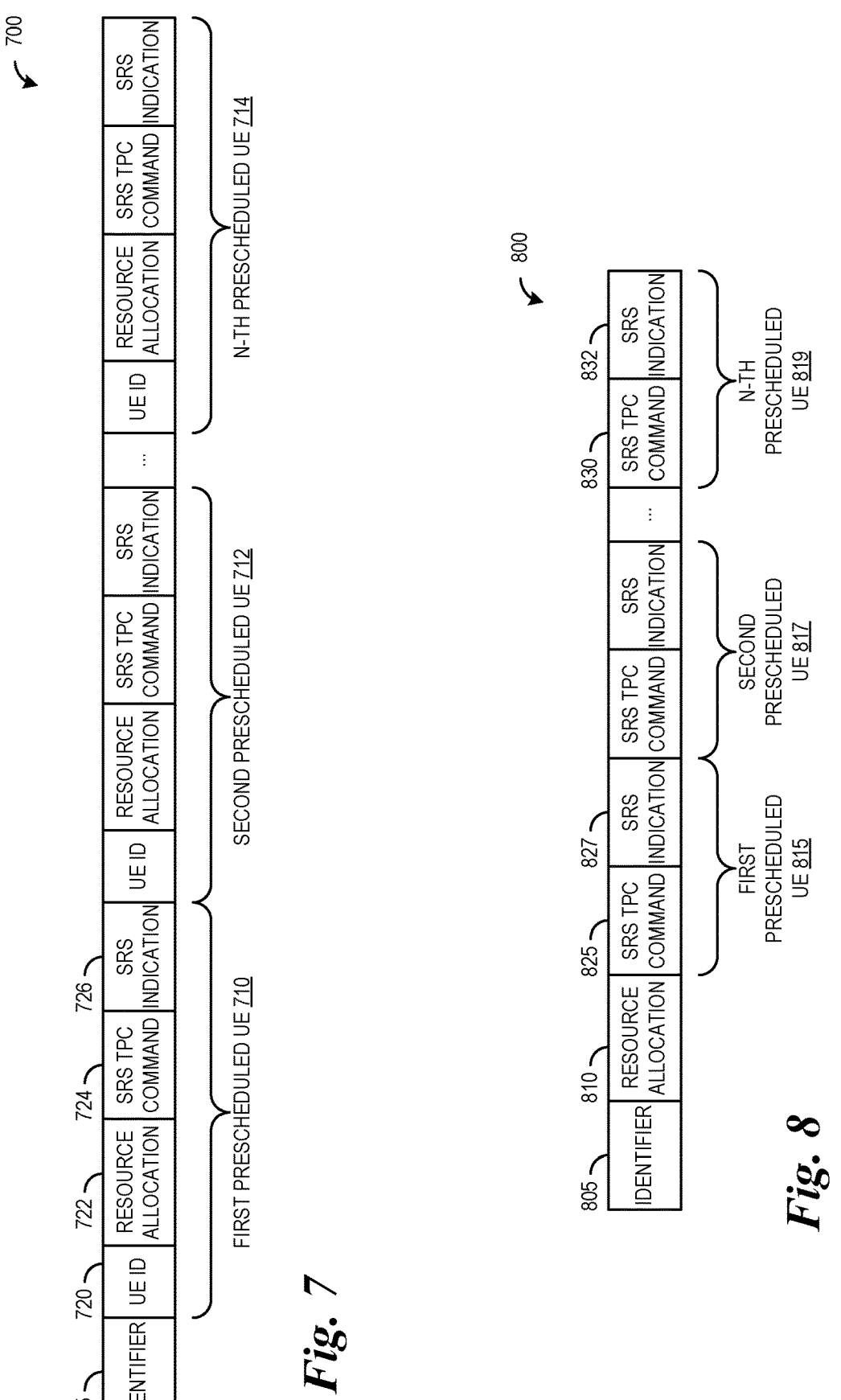
FIG. 7 illustrates a first example DCI according to example embodiments presented herein.
FIG. 8 illustrates a second example DCI according to example embodiments presented herein.

FIG. 7 illustrates a first example DCI 700. DCI 700, as shown in FIG. 7, is an example of a DCI where the DCI includes SRS configuration information for only prescheduled UEs and a short UE identifier is used to identify the UEs. DCI 700 includes an identifier field 705, which identifies the DCI being a DCI for conveying SRS configuration information to prescheduled UEs. DCI 700 also includes SRS configuration information for each of the prescheduled UEs, such as first prescheduled UE 710, second prescheduled UE 712, and N-th prescheduled UE 714.

As an example of the savings achievable by using the short UE identifiers and conveying information only for the prescheduled UEs, consider a situation where an access node is serving 20 UEs, with only 5 prescheduled UEs. If 10 bit long RNTIs are used, the DCI format would need to convey at least 20*10=200 bits of identifying information alone, while using the short UE identifiers and prescheduled UEs, DCI format 700 would need to convey only 5*4=20 bits of identifying information.

For first prescheduled UE 710, DCI 700 includes a UE ID field 720, a resource allocation field 722, a SRS TPC command field 724, and a SRS indication field 726. UE ID field 720 comprising the short UE identifier of the prescheduled UE, and may be 4 bits in size, for example. DCI 700 includes similar information for other prescheduled UEs. Resource allocation field 722 indicates time and frequency resource blocks or groups for first prescheduled UE 710. The size of resource allocation field 722 may depend upon the type of the resource allocation, as well as the BWP size, with the size also being dependent on the Resource allocation type, for example. SRS TPC command field 724 comprises a power control command for the SRS, and may be 2 bits in size, for example. SRS indication field 726 indicates SRS resources, SRS ports, SRS transmission bandwidth, etc. The value in SRS indication field 726 may be preconfigured with a set of different possible arrangements of SRS resources or ports, SRS transmission bandwidth, etc., values and only an index to a particular set of possible SRS resources, SRS ports, SRS transmission bandwidth, etc., is held in SRS indication field 726 to reduce size. SRS indication field 726 may also be used to indicate the mapping with the DL ports (layers, reference signals, etc.). An example SRS indication field 726 size is 4 bits. SRS indication field 726 supports SRS port indication in the uplink to transmit the SRS. Also implicitly indicated is the SRS cyclic shift, SRS subband, SRS comb, etc. Also implicitly indicated is the precoded CSI-RS port(s) assigned to first prescheduled UE 710 in the downlink (e.g., the same ports). The example sizes of the various fields of DCI 700 are for discussion purposes only. The example embodiments presented herein are operable with other field sizes, arrangements, or configurations.

As related to resource allocation fields, such as resource allocation field 722, Resource Type 1 may be used for frequency allocation. Alternatively, Resource Type 2 may be used for frequency allocation. Resource block groups may be used for UEs. Additionally, the frequency allocation may include the allocation for the SRS transmission.

As related to downlink antenna ports, an indication for the UE may be used for downlink ports or downlink layers. As an example, the indication may be a bitmap with each bit of the bitmap corresponding to a downlink antenna port or group of downlink antenna ports. As another example, the indication may be a value. A UE may be able to determine CSI-RS or DMRS ports to use in accordance with the SRS ports allocated to the UE. As an example, the indication may use the SRS indication field. In another embodiment, the indication of the SRS ports may use a bitmap with each bit of the bitmap corresponding to a downlink antenna port or group of SRS ports.

In an embodiment, information associated with configured UEs that are not prescheduled are not included in DCI format 700. A prescheduled UE may process the DCI to determine if the access node has triggered the prescheduled UE for SRS transmission, for example.

In an embodiment, to further reduce DCI size, the SRS configuration information for each prescheduled UE is arranged in order (e.g., increasing or decreasing order) so that it is not necessary to include the short UE identifier in the DCI. Therefore, additional reduction in the DCI size is achieved.

In an embodiment, time and frequency resource blocks or groups are configured for the prescheduled UEs. In FIG. 7, each prescheduled UE may be configured with a different allocation of time and frequency resource blocks or groups. In this embodiment, a single allocation of time and frequency resource blocks or groups is configured for the prescheduled UEs indicated in the DCI. In an embodiment, a single DCI is used to convey SRS configuration information for the prescheduled UEs of the access node. In such a situation, the DCI includes SRS TPC command and SRS indication for each prescheduled UE. The SRS TPC command and SRS indication for each prescheduled UE may be arranged in accordance with the short UE identifier assigned to each prescheduled UE. The SRS TPC command and SRS indication for each prescheduled UE may be arranged in increasing short UE identifier or decreasing short UE identifier, for example.

In an embodiment, a single DCI is used to convey SRS configuration information for a subset of the prescheduled UEs of the access node. In such a situation, the DCI includes SRS TPC command and SRS indication for each prescheduled UE in the subset. As an example, a first DCI includes SRS TPC commands and SRS indications for a first subset of the prescheduled UEs, a second DCI includes SRS TPC commands and SRS indications for a second subset of the prescheduled UEs, and so on. The SRS TPC command and SRS indication for each prescheduled UE in a subset may be arranged in accordance with the short UE identifier assigned to each prescheduled UE in the subset. The SRS TPC command and SRS indication for each prescheduled UE in the subset may be arranged in increasing short UE identifier value or decreasing short UE identifier value, for example.

FIG. 8 illustrates a second example DCI 800. DCI 800, as shown in FIG. 8, is an example of a DCI where there is a single allocation of time and frequency resource blocks or groups is configured for the prescheduled UEs. DCI Boo includes an identifier field 805, which identifies the DCI being a DCI for conveying SRS configuration information to prescheduled UEs, and a resource allocation field 810. Resource allocation field 810 comprising time and frequency resource blocks or groups for the prescheduled UEs indicated in DCI 800. DCI 800 also includes SRS TPC commands and SRS indications for each of the prescheduled UEs, such as first prescheduled UE 815, second prescheduled UE 817, and N-th prescheduled UE 819.

For first prescheduled UE 815, DCI 800 includes a SRS TPC command field 825, and a SRS indication field 827. SRS TPC command field 825 comprising a power control command for the SRS, and may be 2 bits in size, for example. SRS indication field 827 comprising SRS resources, SRS ports, SRS transmission bandwidth, etc. The value in SRS indication field 827 may be preconfigured with a set of possible SRS resources, SRS ports, SRS transmission bandwidth, etc., values and only an index to a particular set of possible SRS resources, SRS ports, SRS transmission bandwidth, etc., is held in SRS indication field 827 to reduce size. An example SRS indication field 827 size is 4 bits. SRS indication field 827 supports SRS port indication in the uplink to transmit the SRS. Also implicitly indicated is the precoded CSI-RS port(s) assigned to the prescheduled UE in the downlink (e.g., the same ports). Also implicitly indicated is the SRS cyclic shift, SRS subband, SRS comb, offset, etc.

In an embodiment, to further reduce DCI size, allocations of time and frequency resource blocks or groups are configured for the prescheduled UEs. The allocation of time and frequency resource blocks or groups may be configured for the prescheduled UEs that are scheduled for SRS transmission. Hence, in such a situation, allocations of time and frequency resource blocks or groups are included for each prescheduled UE that is scheduled for SRS transmission and omitted for each prescheduled UE that is not scheduled for SRS transmission.

Figures 9, 10:
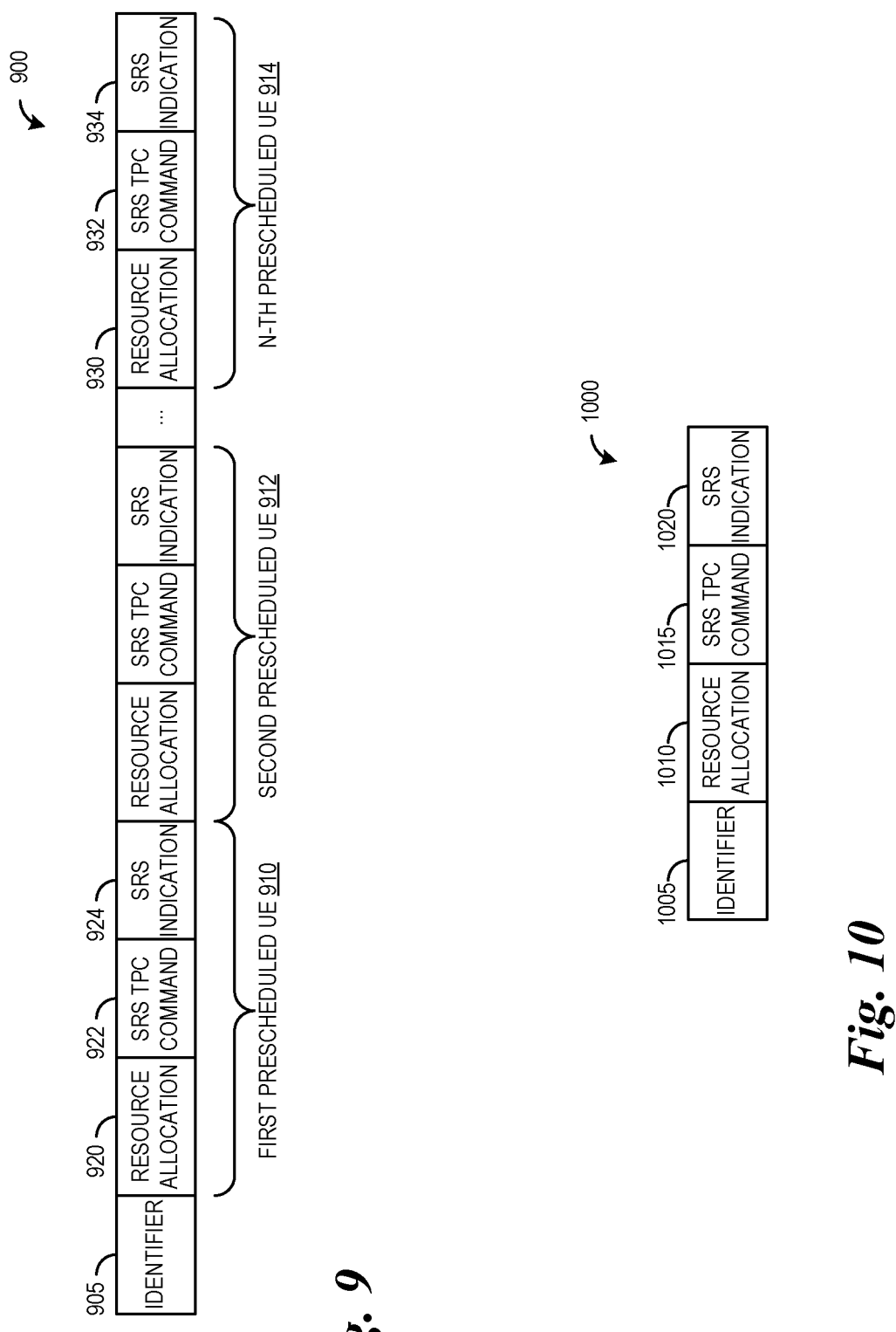
FIG. 9 illustrates a third example DCI according to example embodiments presented herein.
FIG. 10 illustrates a fourth example DCI according to example embodiments presented herein.

FIG. 9 illustrates a third example DCI 900. DCI 900, as shown in FIG. 9, is an example of a DCI where there are allocations of time and frequency resource blocks or groups for each prescheduled UE that is scheduled for SRS transmission. DCI 900 includes an identifier field 905, which identifies the DCI being a DCI for conveying SRS configuration information to prescheduled UEs. DCI 900 also includes information for each prescheduled UE, such as first prescheduled UE 910, second prescheduled UE 912, and N-th prescheduled UE 914. The information may differ depending on the prescheduled UE, e.g., prescheduled UEs that are scheduled for SRS transmission versus prescheduled UEs that are not scheduled for SRS transmission.

For each prescheduled UE that is scheduled for SRS transmission, such as first prescheduled UE 910, DCI 900 includes a resource allocation field 920, a SRS TPC command field 922, and a SRS indication field 924. Resource allocation field 920 comprising time and frequency resource blocks or groups for the prescheduled UE. The size of resource allocation field 920 may depend upon the type of the resource allocation, as well as the BWP size, and may be 10 bits in size, for example. SRS TPC command field 922 comprising a power control command for the SRS, and may be 2 bits in size, for example. SRS indication field 924 comprising SRS resources, SRS ports, SRS transmission bandwidth, etc. The value in SRS indication field 924 may be preconfigured with a set of possible SRS resources, SRS ports, SRS transmission bandwidth, etc., values and only an index to a particular set of possible SRS resources, SRS ports, SRS transmission bandwidth, etc., is held in SRS indication field 924 to reduce size. An example SRS indication field 924 size is 4 bits. SRS indication field 924 supports SRS port indication in the uplink to transmit the SRS. Also implicitly indicated is the precoded CSI-RS port(s) assigned to the prescheduled UE in the downlink (e.g., the same ports). Also implicitly indicated is the SRS cyclic shift, SRS subband, SRS comb, etc. The example sizes of the various fields of DCI 900 are for discussion purposes only. The example embodiments presented herein are operable with other field sizes.

For each prescheduled UE that is not scheduled for SRS transmission, such as N-th prescheduled UE 914, resource allocation field 930, SRS TPC command field 932, and SRS indication field 934 are set to zero or some other specified value. Although FIG. 9 illustrates an example where N-th prescheduled UE 914 is a prescheduled UE that is not scheduled for SRS transmission, any of the N prescheduled UE in DCI 900 may be a prescheduled UE that is not scheduled for SRS transmission.

The example embodiments illustrated in FIGS. 7-9 are for group DCI. However, the example embodiments presented herein are also operable for unicast DCI. In unicast DCI, the DCI is specifically addressed to a single UE. The addressing of the DCI to a particular UE may be accomplished by encoding the DCI with an identifier of the UE. When the DCI is encoded using the identifier of the UE, only the UE will be able to decode the DCI, while other UEs will detect the encoded DCI as noise. Because the DCI is specifically addressed to the UE using its identifier, the DCI does not need to include a unique identifier of the UE. Thereby, the size of the DCI is reduced.

FIG. 10 illustrates a fourth example DCI 1000. DCI 1000, as shown in FIG. 10, is an example of a DCI used in unicast DCI. DCI 1000 includes an identifier field 1005, a resource allocation field 1010, a SRS TPC command field 1015, and a SRS indication field 1020. Identifier field 1005 identifies the DCI being a DCI for conveying SRS configuration information to prescheduled UEs. Resource allocation field 1010 comprising time and frequency resource blocks or groups for the prescheduled UE. The size of resource allocation field 1010 may depend upon the type of the resource allocation, as well as the BWP size, and may be 10 bits in size, for example. SRS TPC command field 1015 comprising a power control command for the SRS, and may be 2 bits in size, for example. SRS indication field 1020 comprising SRS resources, SRS ports, SRS transmission bandwidth, etc. The value in SRS indication field 1020 may be preconfigured with a set of possible SRS resources, SRS ports, SRS transmission bandwidth, etc., values and only an index to a particular set of possible SRS resources, SRS ports, SRS transmission bandwidth, etc., is held in SRS indication field 1020 to reduce size. An example SRS indication field 1020 size is 4 bits. SRS indication field 1020 supports SRS port indication in the uplink, and indicates SRS ports to use to transmit the SRS. Also implicitly indicated is the precoded CSI-RS port(s) assigned to the prescheduled UE in the downlink (e.g., the same ports). Also implicitly indicated is the SRS cyclic shift, SRS subband, SRS comb, offset, etc. The example sizes of the various fields of DCI 1000 are for discussion purposes only. The example embodiments presented herein are operable with other field sizes.

In another embodiment, dynamic signaling using a field (or fields) in the DCI may be used to signal an identifier of a reference downlink resource (or resources). A dedicated field to signal the mapping from a configured fixed mapping may be configured using higher layer signaling.

Figure 11:
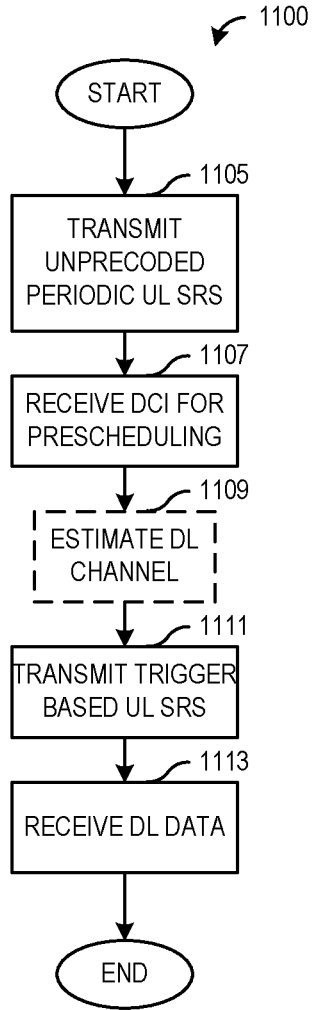
FIG. 11 illustrates a flow diagram of example operations occurring in a UE participating in interference probing and receives downlink data according to example embodiments presented herein.

FIG. 11 illustrates a flow diagram of example operations 1100 occurring in a UE participating in interference probing and receives downlink data. Operations 1100 may be indicative of operations occurring in a UE as the UE participates in interference probing and receives downlink data. The UE may be a prescheduled UE.

Operations 1100 begin with the UE transmitting an uplink SRS (block 1105). The uplink SRS may be unprecoded. The uplink SRS may be periodic in nature. The UE receives DCI from an access node (block 1107). The DCI may include SRS configuration information for the UE. The SRS configuration information configures the UE to make a SRS transmission. The DCI may also include CSI-RS configuration. The DCI may be part of a group DCI message. The DCI may be a unicast DCI message. The UE may estimate the downlink channel (block 1109). The UE estimates the downlink channel using a CSI-RS transmitted by the access node. The UE transmits a precoded SRS (block 1111). The precoded SRS is transmitted in accordance with the SRS configuration information received in the DCI. The UE receives downlink data (block 1113). The downlink data is received from the access node. The downlink data is precoded using a precoder determined in accordance with the precoded SRS transmitted by the UE.

Figure 12:
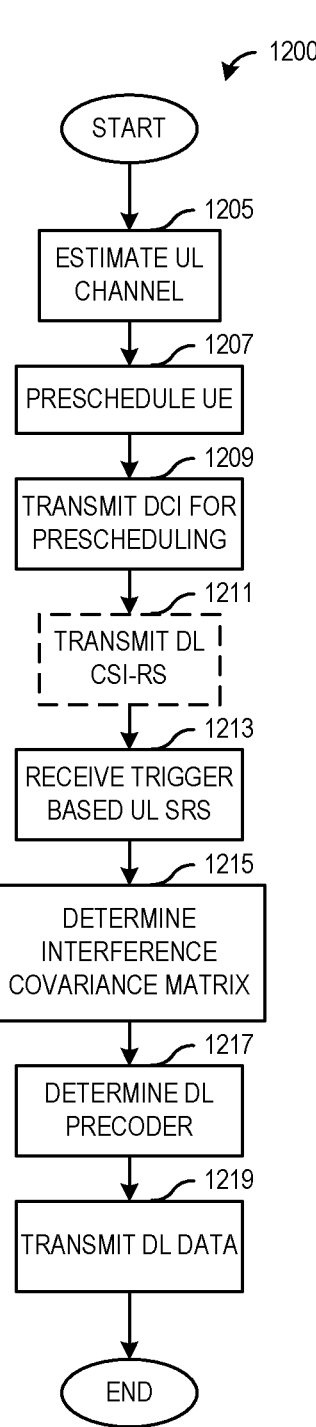
FIG. 12 illustrates a flow diagram of example operations occurring in an access node participating in interference probing and receives downlink data according to example embodiments presented herein.

FIG. 12 illustrates a flow diagram of example operations 1200 occurring in an access node participating in interference probing and receives downlink data. Operations 1200 may be indicative of operations occurring in an access node as the access node participates in interference probing and transmits downlink data.

Operations 1200 begin with the access node estimating an uplink channel (block 1205). The access node estimates the uplink channel using a SRS transmitted by a UE, for example. The SRS may be precoded or unprecoded. The access node preschedules UEs (block 1207). The access node preschedules UEs in accordance with the SRSs transmitted by UEs. As an example, the access node preschedules UEs associated with SRSs with signal quality exceeding a specified threshold. The access node transmits DCI to the prescheduled UEs to trigger SRS transmission (block 1209). The DCI transmitted by the access node may also cause the UE to measure downlink CSI-RS or DMRS. The access node configures SRSs for the prescheduled UEs and sends SRS configuration information to the prescheduled UEs in the DCI. The SRS configuration information may also include CSI-RS information. The DCI may be a group DCI or unicast DCIs.

The access node may transmit a CSI-RS (block 1211). The CSI-RS may be used for downlink channel estimation. The access node receives a precoded SRS (block 1213). The precoded SRS may be received in accordance with the SRS configuration information. The access node determines an interference covariance matrix (block 1215). The interference covariance matrix is determined in accordance with the precoded SRS. The access node determines a downlink precoder (block 1217). The downlink precoder is determined in accordance with the interference covariance matrix. The access node transmits downlink data (block 1219). The downlink data is precoded in accordance with the downlink precoder.

FIG. 13 illustrates a flow diagram of example operations 1300 occurring in an access node configuring uplink SRSs. Operations 1300 may be indicative of operations occurring in an access node as the access node configures uplink SRSs and receives an uplink SRS transmission.

Operations 1300 begin with the access node transmitting a SRS configuration (block 1305). The SRS configuration may be transmitted in downlink control information, e.g., in a group DCI or a unicast DCI. In the situation when the group DCI is used, the group DCI may be addressed to UEs (e.g., prescheduled UEs) using UE identifiers, which are unique within the group of UEs, but are shorter than typical UE identifiers, in order to save signaling overhead, for example. In an embodiment, the SRS configuration includes information regarding arrangements of SRS port resources (e.g., combs, offsets, cyclic shifts, symbols, etc.) The SRS port resources may also be grouped into plurality of resource groups. In an embodiment, the SRS configuration includes sets of SRS ports of SRS resources. In an embodiment, the SRS configuration includes information regarding associations between SRS port resources and downlink port resources (such as CSI-RS ports, DMRS ports, etc.). Also included may be information about mappings between the ports.

The access node transmits an indication of SRS resources (block 1305). In an embodiment, the indication of the SRS resources indicates a SRS resource group to use for uplink SRS transmission. In an embodiment, the indication of the SRS resources indicates a subset of the SRS ports of the SRS resource to use for uplink SRS transmission. In an embodiment, the indication of the SRS resources indicates an association to use to determine the SRS ports to use for uplink SRS transmission. The indication of the SRS resources may be transmitted in downlink control information, e.g., in a group DCI or a unicast DCI. When the group DCI is used, the UE identifiers (as described above) are used. The indication of the SRS resources may be included in a message transmitted after the transmission of the SRS configuration. The message including the indication of the SRS resources may be the first message transmitted after the transmission of the SRS configuration. The access node receives uplink SRS (block 1309). The uplink SRS is received in accordance with the SRS resources as indicated.

FIG. 14 illustrates a flow diagram of example operations 1400 occurring in a UE transmitting uplink SRSs. Operations 1400 may be indicative of operations occurring in a UE as the UE receives an uplink SRS configuration and transmits an uplink SRS.

Operations 1400 begin with the UE receiving a SRS configuration (block 1405). The SRS configuration may be received in downlink control information, e.g., in a group DCI or a unicast DCI. In the situation when the group DCI is used, the group DCI may be addressed to UEs (e.g., prescheduled UEs) using UE identifiers, which are unique within the group of UEs, but are shorter than typical UE identifiers, in order to save signaling overhead, for example. In an embodiment, the SRS configuration includes information regarding arrangements of SRS port resources (e.g., combs, offsets, cyclic shifts, symbols, etc.). The SRS port resources may also be grouped into plurality of resource groups. In an embodiment, the SRS configuration includes sets of SRS ports of SRS resources. In an embodiment, the SRS configuration includes information regarding associations between SRS port resources and downlink port resources (such as CSI-RS ports, DMRS ports, etc.). Also included may be information about mappings between the ports. Even if the UE is not an intended recipient of the SRS configuration, the UE receives the downlink control information and attempts to decode the downlink control information.

The UE receives an indication of SRS resources (block 1407). In an embodiment, the indication of the SRS resources indicates a SRS resource group to use for uplink SRS transmission. In an embodiment, the indication of the SRS resources indicates a subset of the SRS ports of the SRS resource to use for uplink SRS transmission. In an embodiment, the indication of the SRS resources indicates an association to use to determine the SRS ports to use for uplink SRS transmission. The indication of the SRS resources may be received in downlink control information, e.g., in a group DCI or a unicast DCI. When the group DCI is used, the UE identifiers (as described above) are used. The indication of the SRS resources may be included in a message received after the reception of the SRS configuration. The message including the indication of the SRS resources may be the first message received after the transmission of the SRS configuration. The UE transmits the uplink SRS (block 1409). The uplink SRS is transmitted in accordance with the SRS resources as indicated.

Some embodiments described above for flexible A-SRS triggering for BIT may lead to higher DCI overhead as it contains more bits in the SRS request field. In addition, the A-SRS triggering may occur more frequently, such as each time a MU scheduling occurs. To reduce DCI overhead, some example embodiments are provided. First, a more flexible framework to split SRS transmission parameter information among RRC configuration signaling, MAC CE, and DCI would be useful. Minimizing standard impact is achieved by keeping as much SRS transmission parameter information in RRC and MAC as possible, and the DCI contains only the minimum parameter information necessary for dynamic signaling. Furthermore, existing DCIs can be enhanced to include new fields and be associated with new UE behavior.

Example embodiments are provided for group-common DCI based overhead reduction.

BIT sounding is to support PDSCH with MU-MIMO, in which multiple UEs are paired together in PDSCH transmission and its associated DMRS. Therefore, BIT sounding should "mirror" the PDSCH DMRS. For example, it is known that for the PDSCH DMRS Type 1, at most 8 DMRS ports per RBG per cell can be supported. Correspondingly, 8 SRS port resources can be split and indicated to a number of UEs, where the SRS port resources are in terms of cyclic shift, comb and shift, and also possibly OFDM symbols of a RBG of a cell. Then a mapping (i.e., an association) of DL DMRS ports to the SRS port resources can be designed and the port information can be signaled to the UEs via the SRS trigger. This may be done in an overhead-efficient way via GC DCI sent to the set of UEs possibly paired for MU transmissions in a slot.

The GC DCI can trigger SRS to be sent from multiple UEs at the same time, i.e., a common triggering offset can be used. In addition, other fields, such as the CMR or IMR indication, may be included, and the design may be similar to a CSI request field as in DCI format 0_1. An embodiment includes a GC DCI for flexible A-SRS triggering with reduced overhead, and the GC DCI is sent to a set of UEs possibly paired for MU transmission in a slot, with a common triggering offset, and each UE is assigned with UE-specific frequency domain resource assignment (FDRA), port allocation (with respect to the UE's serving cell's available SRS port resources, e.g., cyclic shift, comb, offset, and shift), and CMR or IMR indication.

In an embodiment, a new field of A-SRS triggering offset with slot offset k0 and symbol position is included in the GC DCI. In an embodiment, a new field of A-SRS beamforming with dynamically indicated DL CMR or IMR similar to the CSI request field in DCI format 0_1 is included in the GC DCI. In an embodiment, a higher priority for the A-SRS in the GC DCI is assumed by the UE if the A-SRS is assigned with a FDRA and/or port allocation. In an embodiment, the UE-specific port allocation field is replaced by a group-common (joint) port allocation field for all UEs paired on the RBG (or associated frequency domain unit), by indicating only the ranks (number of layers for a data or number of ports for SRS or DMRS) of the paired UEs (the ordering of the UEs may be indicated elsewhere, or UE ID is also included to accompany the rank allocation). With this example embodiment, the ports of a UE have to follow a certain pattern such as consecutive or evenly spaced, but as long as the ranks are indicated, each UE can determine its SRS port resources.

Embodiments are provided for supporting UE-specific DCI based overhead reduction. To reduce DCI overhead, an embodiment uses DL DCI formats 1_0 or 1_1 for both A-SRS triggering and PDSCH scheduling, and the SRS and PDSCH have the same PRB or port allocation. In DCI formats 1_0 or 1_1, there are already fields for: 1) A-SRS trigger, 2) dynamically indicated PDSCH PRB allocation via a DL FDRA field, 3) dynamically indicated PDSCH ports, and 4) possibly a field for a PRB bundling size indicator (as in DCI format 1_1), etc. These fields can be (re)used by the UE for SRS triggering purposes. New fields for BIT purposes are also added, e.g., SRS resource indication, SRS triggering offset (similar to PDSCH SLIV), a field for a CMR or IMR indication which may be similar to a CSI request field as in DCI format 0_1. The UE assumes that the FDRA and ports are also applied for the triggered SRS, which can considerably reduce DCI overhead. For the port indication, a mapping (an association) of DCI DL port indication to SRS ports (in terms of cyclic shift, comb and shift) is needed, which can be defined in Release-17.

In an embodiment, UE-specific DCI (e.g., format 1_1) is reused, with the introduction of new fields for flexible A-SRS triggering with reduced overhead. In the embodiment, the UE first performs A-SRS transmission according to existing fields of FDRA, port indication, and PRB bundling size indicator, as well as the new fields of SRS resource indicator, SRS triggering offset, and CMR/IMR indication. The UE then performs PDSCH reception according to at least the same FDRA and port indication in the same DCI. In an embodiment, a new field of A-SRS triggering offset with slot offset k0 and symbol position is included in the UE-specific DCI. In an embodiment, a new field of A-SRS beamforming with dynamically indicated DL CMR and/or IMR similar to the CSI request field in DCI format 0_1 is included in the UE-specific DCI. In an embodiment, a higher priority for the A-SRS in the UE-specific DCI is assumed by the UE if the A-SRS is assigned with a FDRA and/or port allocation.

Embodiments are provided for supporting both UE-specific DCI based overhead reduction and GC DCI based overhead reduction, for flexible A-SRS triggering for interference probing. In an embodiment, the GC DCI is an enhanced GC DCI format 2_3 with UE FDRA and port indication. In an embodiment, the UE-specific DCI is an enhanced DL DCI formats 1_0 or 1_1 to reinterpret existing FDRA or port indication fields for SRS transmission. In an embodiment, both above embodiments are supported. In an embodiment, the enhanced GC DCI or UE-specific DCI are supported and become new DL DCI formats. In any embodiment, a new field for A-SRS triggering offset with slot offset k0 and symbol position can be included. In any embodiment, a new field for A-SRS beamforming with dynamically indicated DL CMR or IMR similar to the CSI request field in DCI format 0_1 can be included. In any embodiment, a higher priority for the A-SRS is assumed by the UE if the A-SRS is assigned with a FDRA or port allocation.

In an embodiment, the GC DCI or UE-specific DCI are for TDD with UL operating in OFDM (rather than single carrier FDMA (SC-FDMA)). In order to properly utilize BIT or SRS probing for the DL, the UL and DL should be as symmetric as possible. Because the DL is only OFDM, it is more suitable that the UL is also OFDM. This may also be more suitable if the PDSCH or SRS transmissions are not consecutive in the frequency domain, such as with PRB skipping, FDRA type 0 with non-consecutive RBGs, interleaved VRB to PRB mapping, etc.

In an embodiment, the GC DCI or UE-specific DCI reuse the PDSCH TDRA design for its SRS triggering offset design. In an embodiment, the GC DCI or UE-specific DCI reuse the PUSCH TDRA for its SRS triggering offset design. In an embodiment, the GC DCI or UE-specific DCI reuse the PUSCH or PDSCH TDRA for its SRS triggering offset design, but modify the L value configuration and range so that it fits into SRS transmissions. For example, the network may configure SRS to be only on 8~14 OFDM symbols, and hence the current range of L for PUSCH of 4~14 or 1~14 may be modified to 8~14, so that L value can require fewer bits to indicate.

In an embodiment for the GC DCI or UE-specific DCI include a new field of A-SRS beamforming with dynamically indicated DL CMR or IMR. The field may be similar to the CSI request field in DCI format 0_1, or may reuse the same indication or configuration as the CSI request field, for example. In an embodiment the A-SRS beamforming field is identical to the CSI request field with 0, 1, 2, 3, 4, 5, or 6 bits determined by higher layer parameter reportTriggerSize. When all the bits of the field in the DCI are set to zero, the SRS is not beamformed. A non-zero codepoint of the field in the DCI is mapped to the CMR or IMR associated with a CSI triggering state according to the order of the associated positions of the up to $2^{N_{TS}}-1$ trigger states in CSI-AperiodicTriggerStateList with codepoint '1' mapped to the triggering state in the first position, for example. After the UE determines the CMR from the field, the CMR's ports are also selected by the UE according to the antenna port indication field, and the selected CMR ports and the indicated or associated IMR are used by the UE to generate the SRS beamforming for each SRS port.

SRS coverage may be limited by the transmission power of the UE if the DL coverage for the UE is not an issue. To overcome the power limitation, the following embodiments are provided.

An embodiment focuses the power on the narrower bandwidth or fewer subcarriers to increase the UL receive SNR. Current sounding already supports non-wideband transmissions (4 RBs at the minimum, for example), but in a coverage-limited scenario, the narrowband sounding may be further split into multiple partial soundings to cover the bandwidth of one narrowband sounding. Narrowband sounding is also useful in taking advantage of frequency selectivity and reducing interference between SRS from different UEs. In addition, narrowband sounding also improves the frequency-selective precoding by SRS.

To support partial bandwidth sounding, the standards may allow 1~2 PRB sounding, PRB skipping, larger comb (i.e., RE skipping), etc.

However, an issue that may arise from partial bandwidth sounding is that the access node may not be able to combine multiple partial bandwidth sounding transmissions to obtain wideband CSI, because each sounding transmission is generally associated with an unknown random phase. This needs to be addressed.

An embodiment repeats the sounding in the time domain, including multiple symbols in the same slot and across multiple slots. Simple repetition can be supported. Repetition with a different comb or comb shift or (staggered in REs or PRBs or with different densities) may also be allowed.

An embodiment is to allow time domain orthogonal cover codes (TD-OCC) in SRS. In the transmission of the CSI-RS, TD-OCC is supported so that multiple OFDM symbols can be utilized to strengthen CSI-RS transmission. This can also be adopted in SRS.

In order to increase SRS capacity, embodiments should allow more UEs to sound at the same time, and allow more sounding opportunities or resources as well as SRS transmissions multiplexed with other signals.

An embodiment uses less time or frequency resources for each SRS transmission. If each SRS transmission occupies fewer subcarriers or OFDM symbols, then more UEs can sound and SRS capacity is increased. For example, SRS comb may be increased to 8 or 12. For another example, PRB skipping or narrower bandwidth for SRS may be considered, which can also improve SRS coverage described above.

An embodiment allows non-orthogonal low-correlation sequences to be used. In general, the number of orthogonal sequences for SRS is limited. To allow more SRS transmissions be multiplexed on overlapping time or frequency resources, non-orthogonal low-correlation sequences may be adopted. The network can configure or trigger the transmission of non-orthogonal sequences when needed, such as when SRS capacity becomes a limiting factor for operations, but can still use only orthogonal sequences at other times.

An embodiment allows more time or frequency resources to be used by SRS. For example, all 14 symbols in a UL slot may be used for SRS, which is already supported in NR-U. To provide this flexibility, flexible configuration and triggering of SRS need to be standardized. This also motivates flexible A-SRS triggering to dynamically or opportunistically utilize unused UL symbols or PRBs or even DL symbols or PRBs in TDD. To support the latter, a SRS switching gap (due to RF retuning, for example) similar to SRS carrier-based switching may be used for harvest some unused DL symbols, i.e., the UE switches from DL reception to SRS transmission on one or several OFDM symbols according to network configuration or indication after a SRS switching gap, and switches back to DL reception after the SRS transmission and another SRS switching gap. Additionally, concurrent SRS and PUCCH transmission or even SRS and PUSCH transmission may be considered to allow more SRS opportunities.

In 3GPP Release 17, further enhanced MIMO (FeMIMO) sounding reference signal enhancements include:

Identify and specify enhancements on aperiodic SRS triggering to facilitate more flexible triggering or DCI overhead or usage reduction;

Specify SRS switching for up to 8 antennas (e.g., xTyR, x={1, 2, 4} and y={6, 8});

Evaluate and, if needed, specify the following mechanism(s) to enhance SRS capacity or coverage: SRS time bundling, increased SRS repetition, partial sounding across frequency, and so on.

Motivations regarding flexible triggering include:

Limited triggering info in the DCI (1, 2, or 3 bits only);

Inflexible triggering delay;

Vital roles of the SRS in DL full MIMO CSI acquisition, BM, UL frequency diversity and MIMO support, etc.;

Vital roles of an A-SRS in TDD cooperative MIMO via DL interference probing and mitigation include:

UE to Tx SRS according to DL (pre-)scheduling results, so that the access node can estimate DL interference and then mitigate DL interference via precoder adjustment, Some similarity with DL non-zero power (NZP) CSI-RS based interference probing for better modulation and coding scheme (MCS). This is also after scheduling and before PDSCH, but with UL SRS for better precoding (hence bi-directional training, BIT).

Also closely related to SRS coverage or capacity enhancements.

Figure 15:
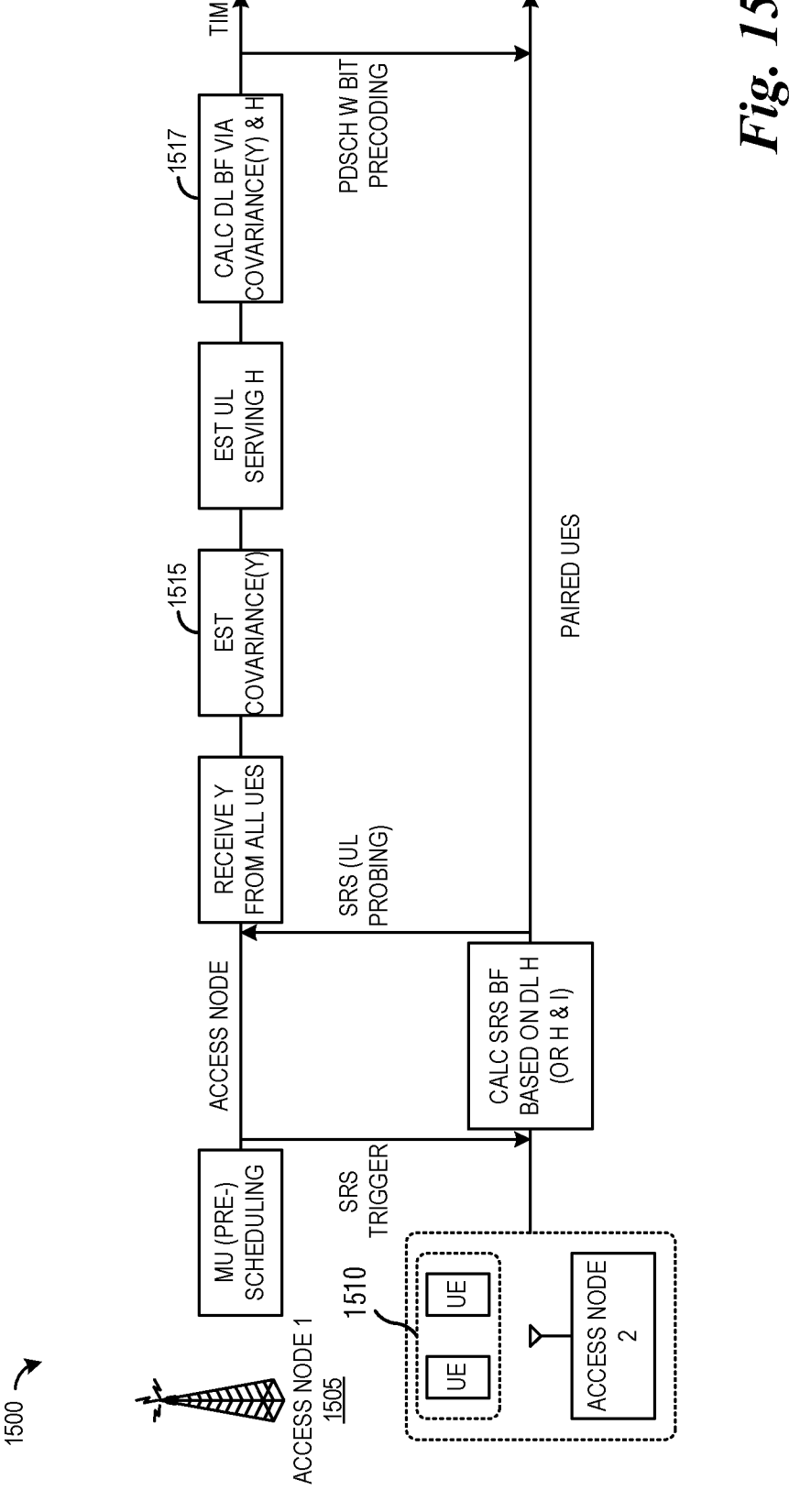
FIG. 15 illustrates an example one-shot BIT operation flow according to example embodiments presented herein.

FIG. 15 illustrates an example one-shot BIT operation flow 1500. BIT operation flow 1500 involves an access node 1505 and paired UEs 1510. In BIT, precoded SRSs (transmitted by paired UEs 1510) is based on PDSCH scheduling and then the PDSCH itself. The precoded sounding is based on MU pre-scheduling allowing access node 1505 to cooperatively probe the DL interference conditions in the UL.

As shown in FIG. 15, Covariance(Y) (block 1515) captures inter/intra cell interference in UL and the $(Cov(Y))^{-1}$ h (block 1517) enables UL interference avoidance. Then, by reciprocity, DL Tx with this precoding enables cooperative DL interference avoidance. Theoretical guidance is derived from global optimization, for example. In 5G NR, SRS used for reciprocity-based CSI acquisition is configured as "SRS for antenna switching".

Figure 16A:
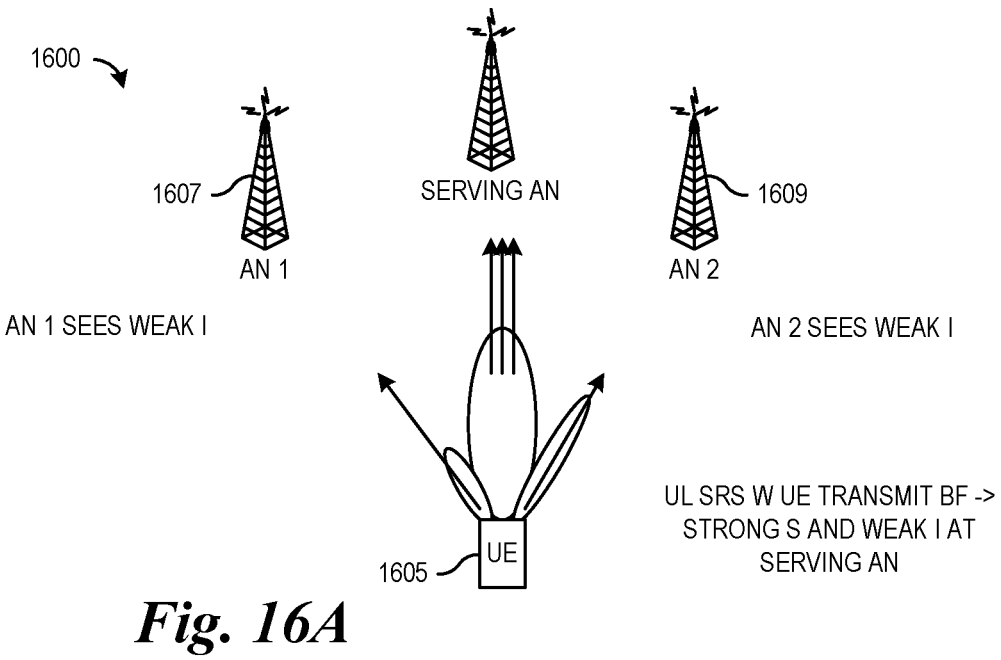
FIGS. 16A and 16B illustrate communication systems highlighting example interference conditions according to example embodiments presented herein.
Figure 16B:
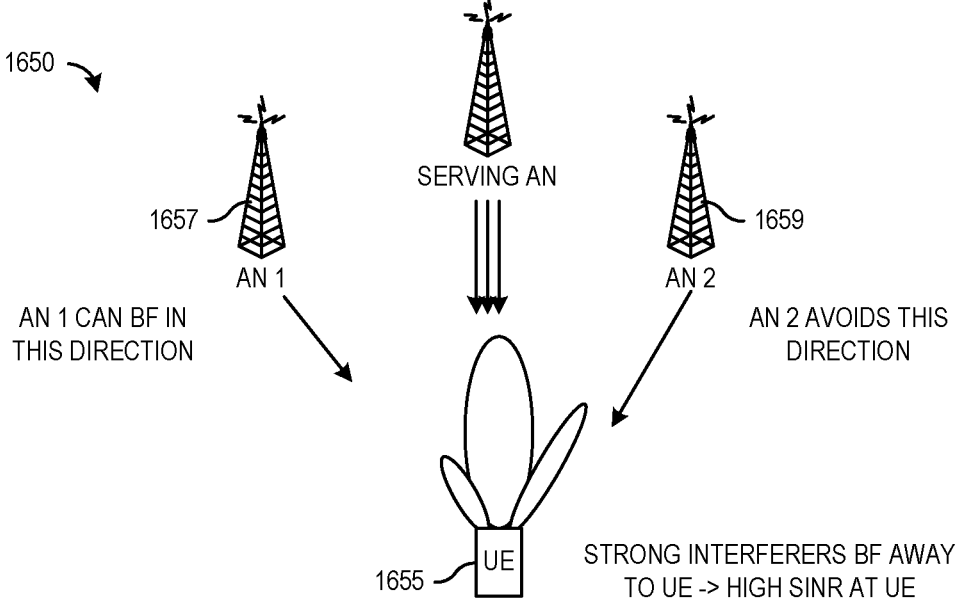

FIGS. 16A and 16B illustrate communication systems 1600 and 1650 highlighting example interference conditions. Communication system 1600 of FIG. 16A illustrates a situation where UL SRS transmissions made by UE 1605, using transmit beamforming results in weak interference at a first access node 1607, while a second access node 1609 sees strong interference. Communication system 1650 of FIG. 16B illustrates a situation where beamforming may be used to reduce interference to UEs. A first access node 1657 can use beamforming in the direction of UE 1655, but a second access node 1659 avoids beamforming in the direction of UE 1655 because such transmissions may cause high interference at UE 1655.

As related to flexible A-SRS triggering for BIT:

The SRS may include enhancements with dynamically indicated parameters associated with corresponding DL transmissions. They may include:

A-SRS triggering with dynamically indicated PRB allocation (e.g., FDRA) and port allocation, A-SRS triggering with dynamically indicated DL CMR or IMR, A-SRS triggering with flexible triggering delay.

As related to reducing DCI overhead for flexible triggering, motivations include:

Presence of the flexible triggering may lead to higher DCI overhead; and

BiT may also require more A-SRS triggers.

Example embodiments may include:

UE-specific DCI for A-SRS with FDRA and port indication (same as PDSCH). However, FDRA may require 5~19 bits in general, and port indication may require 4~6 bits.

Group common DCI to a set of UEs possibly paired for MU transmission in a slot, with FDRA and port indication. However, SRS triggering offsets may not be equal for the set of UEs.

According to an example embodiment, methods and apparatus for configuration of the SRS transmissions with all the needed SRS parameters in DCI but with reduced DCI overhead, as well as the associated UE assumptions, behaviors, or configurations to support this are provided. Table 1 presents the existing DCI 1-1 format used for scheduling of PDSCH in a single cell. Table 2 presents antenna ports for a variety of DMRS types in 3GPP TS 38.212. The existing DCI format does not indicate SRS transmission parameters (other than the 2-bit SRS request), and the SRS triggered by the SRS request is transmitted based on parameters pre-configured in RRC configuration signaling for SRS, e.g., SRS-config.

TABLE 1

Current DCI 1-1 format used for scheduling of PDSCH in one cell.

| Field (Item) | Bits | Reference |
|---|---|---|
| Carrier indicator | 0, 3 | |
| Identifier for DCI formats | 1 | Always set to 1, indicating a DL DCI format |
| Bandwidth part indicator | 0, 1, 2 | |
| Frequency domain resource assignment | Variable | Variable with Resource Allocation Type |
| Time domain resource assignment | 4 | Carries the row index of the items in pdsch_allocationList in RRC |
| VRB-to-PRB mapping | 0, 1 | 0 bit if only resource allocation type 0 is configured or if interleaved VRB-to-PRB mapping is not configured by high layers; 1 bit according to Table 7.3.1.1.2-33 otherwise, only applicable to resource allocation type 1 |
| PRB bundling size indicator | 0, 1 | 0 bit if the higher layer parameter prb-BundlingType is not configured or is set to 'static' 1 bit if the higher layer parameter prb-BundlingType is set to 'dynamic' |
| Rate matching indicator | 0, 1, 2 | Bit size is determined by higher layer parameters rateMatchPatternGroup1 and rateMatchPatternGroup2. |
| ZP CSI-RS Trigger | 0, 1, 2 | |
| Modulation and coding scheme [TB1] | 5 | |
| New data indicator [TB1] | 1 | |
| Redundancy version [TB1] | 2 | |
| Modulation and coding scheme [TB2] | 5 | |
| New data indicator [TB2] | 1 | |
| Redundancy version [TB2] | 2 | |
| HARQ process number | 4 | |
| Downlink assignment index | 0, 2, 4 | 4 bits if more than one serving cell are configured in the DL and the higher layer parameter pdsch-HARQACK-Codebook = dynamic, where the 2 MSB bits are the counter DAI and the 2 LSB bits are the total DAI; 2 bits if only one serving cell is configured in the DL and the higher layer parameter pdsch-HARQ-ACKCodebook = dynamic, where the 2 bits are the counter DAI; 0 bits otherwise. |

TABLE 1-continued

Current DCI 1-1 format used for scheduling of PDSCH in one cell.

| Field (Item) | Bits | Reference |
|---|---|---|
| TPC command for scheduled PUCCH | 2 | |
| PUCCH resource indicator | 2 | |
| PDSCH-to-HARQ_feedback timing indicator | 0, 1, 2, 3 | Row number(index) of K1 Number of bit is determined by log2(I). 'I' is the number of elements in the IE PUCCH-Config.dl-DataToUL-ACK |
| Antenna port(s) and number of layers | 4, 5, 6 | Determined by dmrs Configuration Type and max Length. See the table to the right. |
| Transmission configuration indication | 0, 3 | 0 bit if higher layer parameter tci-PresentInDCI is not enabled; 3 bits otherwise |
| SRS request | 2 | |
| CBG transmission information(CBGTI) | 0, 2, 4, 6, 8 | |
| CBG flushing out information(CBGFI) | 0, 1 | |
| DMRS sequence initialization | 1 | |

TABLE 2

Antenna ports

| dmrs-Type | maxLength | Bit Field Length | Table in 38.212 |
|---|---|---|---|
| 1 | 1 | 4 | Table 7.3.1.2.2-1 |
| 1 | 2 | 5 | Table 7.3.1.2.2-2 |
| 2 | 1 | 5 | Table 7.3.1.2.2-3 |
| 2 | 1 | 6 | Table 7.3.1.2.2-4 |

According to an example embodiment, an enhanced DCI 1-1 format is provided. The enhanced DCI 1-1 format supports the scheduling of PDSCH in one cell, as well as associated SRS probing. Table 3 presents details regarding an example enhanced DCI 1-1 format usable for scheduling PDSCHs in a single cell and associated SRS probing. With the enhancement, the DCI format can also indicate SRS transmission parameters for the SRS transmission triggered by the SRS request field, i.e., the SRS transmission reuses some PDSCH transmission parameters and ignore the corresponding SRS transmission parameters pre-configured in RRC signaling such as in SRS-config. The resulting SRS transmission is based on some parameters configured in SRS-config (e.g., SRS comb, sequence, etc.) and other parameters indicated for the co-scheduled PDSCH (e.g., FDRA, etc.).

TABLE 3

Example enhanced DCI 1-1 format used for scheduling
PDSCH in one cell and associated SRS probing.

| Field (Item) | Bits | Reference | Notes |
|---|---|---|---|
| Frequency domain resource assignment (FDRA) | Variable | Variable with Resource Allocation Type | Existing for PDSCH. Now apply to PDSCH and SRS |
| Time domain resource assignment (TDRA) | 4 | Carries the row index of the items in pdsch_allocationList in RRC | Existing for PDSCH. No change |
| VRB-to-PRB mapping | 0, 1 | 0 bit if only resource allocation type 0 is configured or if interleaved VRB-to-PRB mapping is not configured by high layers; 1 bit according to Table 7.3.1.1.2-33 otherwise, only applicable to resource allocation type 1 | Existing for PDSCH. Now may also apply to SRS |
| PRB bundling size indicator | 0, 1 | 0 bit if the higher layer parameter prb-BundlingType is not configured or is set to 'static' 1 bit if the higher layer parameter prb-BundlingType is set to 'dynamic' | Existing for PDSCH. Now may also apply to SRS |
| Antenna port(s) and number of layers | 4, 5, 6 | Determined by dmrs Configuration Type and max Length See e.g., Table 7.3.1.2.2-2 of TS 38.212 v16.2.0. | Existing for PDSCH. Now apply to PDSCH and SRS |
| SRS request | 2 or more | | Existing. Now may add more bits for SRS resource selection |
| SRS Time domain resource assignment | 0, 4 | Carries the row index of the items in pdsch_allocationList or pusch_allocationList or srs_allocationList in RRC. Optional. Default is per RRC configuration | New. Apply to SRS. Optional. Shall be earlier than PDSCH |

TABLE 3-continued

Example enhanced DCI 1-1 format used for scheduling
PDSCH in one cell and associated SRS probing.

| Field (Item) | Bits | Reference | Notes |
|---|---|---|---|
| SRS TPC command | 0, 2 | Optional for SRS power control | New. Optional. May present if SRS has separate power control than PUSCH |
| SRS beamforming indicator | 0~6 | Optional, indicate SRS beamforming/precoding based on a CMR and optionally an IMR. If not present then a default CMR is used for SRS beamforming determination | New. Optional. Can reuse 0_1 CSI Request field design |
| . . . | | | Other fields: same as before |

In an embodiment, the enhanced DCI 1-1 format includes the following beneficial features:

The FDRA field and the antenna port(s) indications field support SRS probing, but the overhead is high. The enhanced DCI 1-1 design reuses the existing FDRA and antenna port indications fields in the associated PDSCH-scheduling DCI, and adds a new SRS triggering offset, so that a single DCI can be used for two operations (SRS transmissions and PDSCH reception, for example).

The GC DCI may also add a new SRS triggering offset field, so that all SRSs are transmitted on overlapping resources for BiT purposes.

FIG. 17 illustrates a diagram 1700 of information exchanged between an access node 1705 and a UE 1707 as access node 1705 configures UL SRS sounding and then makes a DL transmission based on the UL SRS sounding results. Access node 1705 transmits the configuration of the SRS ports (event 1710). The transmission is made to UE 1707. The configuration of the SRS ports includes the mapping to the SRS port resources. Access node 1705 transmits the DCI (event 1712). The DCI includes the SRS request and the PDSCH scheduling. UE 1707 transmits the A-SRS in accordance with the DCI (event 1714). The A-SRS may be transmitted in accordance with the FDRA or port indication, as well as the SRS triggering offset included in the DCI, for example.

As shown in FIG. 17, the A-SRS transmission may also be made in accordance with the carrier indicator field, BWP indicator field, VRB-PRB mapping field, PRB bundling size field, TPC command for the PUCCH field, or TPC command for the SRS field in the DCI. Furthermore, the SRS triggering offset may be indicated in a TDRA field (reused design from PUSCH or PDSCH, for example). A CMR, and optionally an IMR, may be included for UE 1707 to determine the SRS precoding, which may reuse the design of CSI request field, for example.

Example SRS mapping of resources and ports may be as follows (referencing FIG. 4):

Assume that DMRS Type 1, i.e., 8 ports, RBG, or cell for all paired UEs, is used.

The 8 ports are associated with 8 SRS port resources, selected from n available port resources, such as:

For comb 4, n=48,

For comb 2, n=16.

The SRS from neighboring cells should be multiplexed on the n SRS port resources, Then, to indicate to a UE which 1, 2, or 4 SRS port resources out of the available n SRS port resources would require too many bits.

Figure 18:
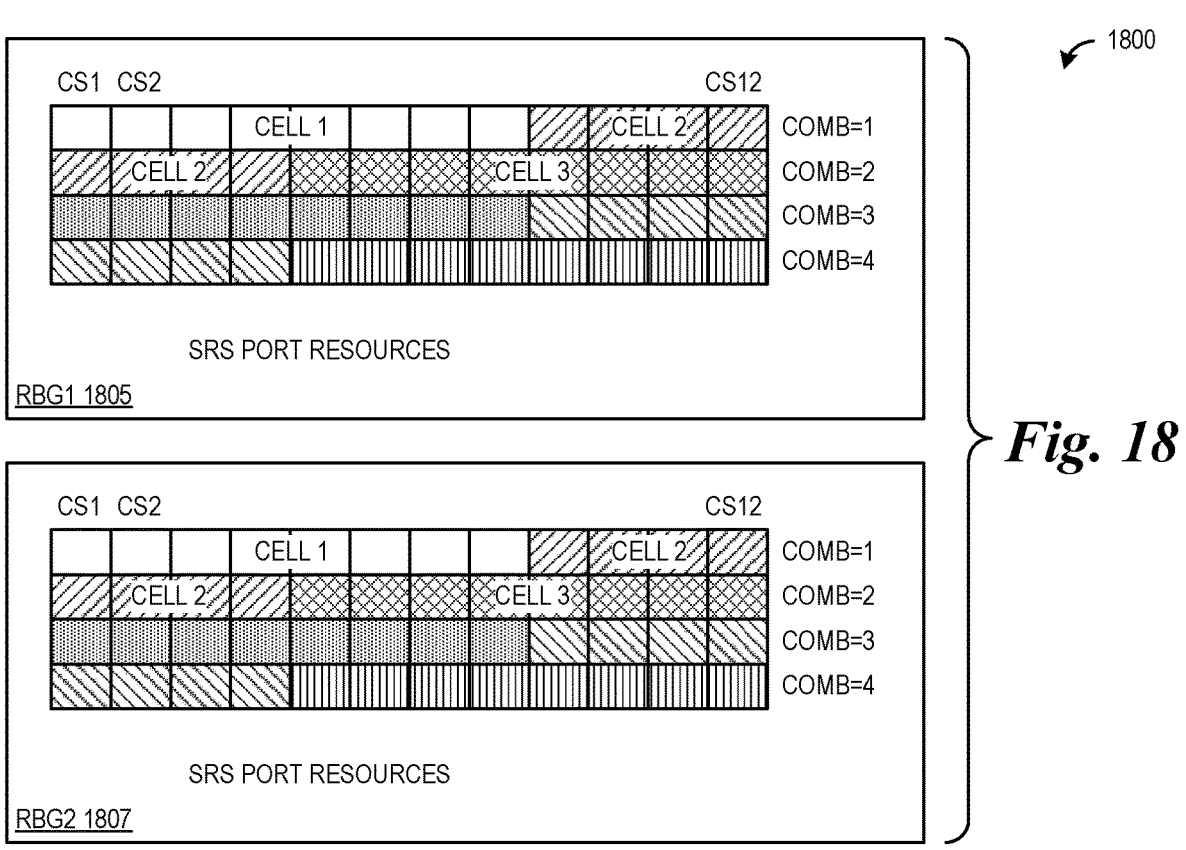
FIG. 18 illustrates diagrams of RGBs with an example mapping of SRS resources and ports according to example embodiments presented herein.

FIG. 18 illustrates diagrams 1800 of RGBs 1805 and 1807 with an example mapping of SRS resources and ports. In an embodiment, the UE-group CSI-RS or DMRS design is applied to the SRS design. As an example, for each cell, restrict the cell to only a specified number (e.g., 8, but other values are possible) of pre-defined SRS port resources. Then, in the group DCI, indicate the layers or ports for a UE from the specified number (e.g., 8) of pre-defined SRS port resources. For example, configure a SRS resource for all active UEs in cell 1 with all SRS resources having the same 8 ports. The group DCI indicates which of the 8 ports are for a particular UE. For example, rank [1, 2, 4, 1] are signaled for UE 1, 2, 3, 4. There is no need to indicate the layer index. For another example, reuse DMRS port mapping. As another example, the SRS resource may be configured for all RBGs, but the scheduling or group DCI allows different UEs to be scheduled on different RBGs.

Figures 19, 20:
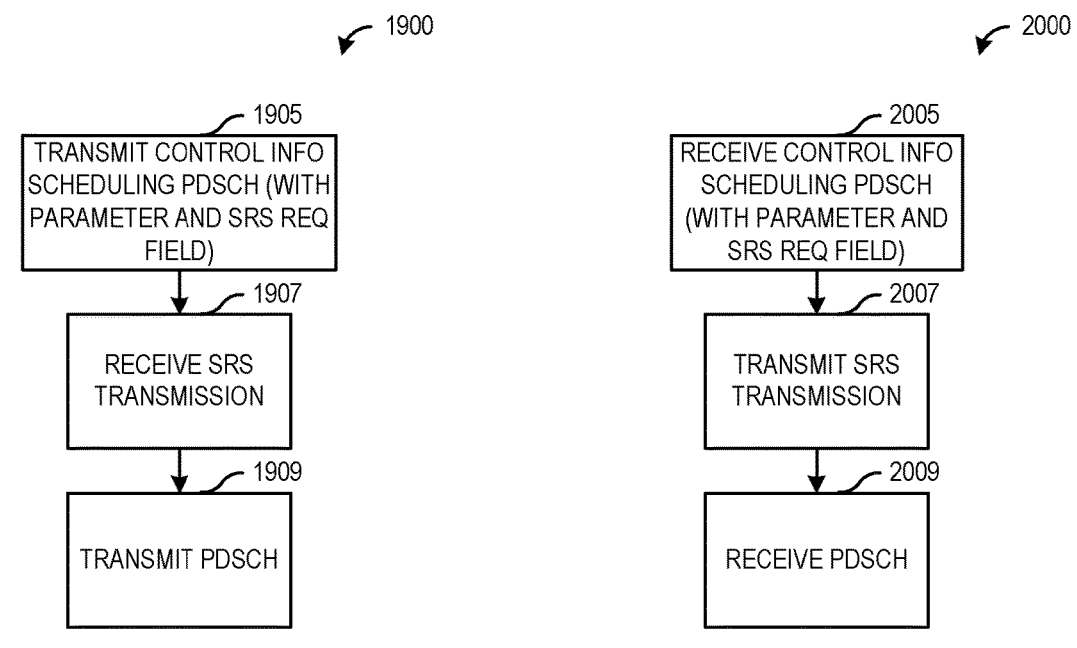
FIG. 19 illustrates a flow diagram of example operations occurring in an access node scheduling a PDSCH and associated SRS probing using an example enhanced DCI according to example embodiments presented herein.
FIG. 20 illustrates a flow diagram of example operations occurring in a UE receiving a PDSCH and associated SRS probing in an example enhanced DCI according to example embodiments presented herein.

FIG. 19 illustrates a flow diagram of example operations 1900 occurring in an access node scheduling a PDSCH and associated SRS probing using an example enhanced DCI. Operations 1900 may be indicative of operations occurring in an access node as the access node schedules a PDSCH and associated SRS probing using an example enhanced DCI.

Operations 1900 begin with the access node transmitting a DCI (block 1905). The DCI may be transmitted to schedule a PDSCH, for example. The DCI includes scheduling information for the PDSCH. In addition to the scheduling information for the PDSCH, the DCI includes a parameter for the scheduled PDSCH and a SRS request field. The parameter may include a frequency domain parameter or a spatial domain parameter, or both a frequency domain parameter and a spatial domain parameter. The frequency domain parameter may include a FDRA, for example, while the spatial domain parameter may include an antenna port(s) indication, for example. The DCI may also include one or more A-SRS parameters, including a SRS TDRA, a SRS slot indication, a SRS start symbol indication, a SRS allocation length indication, a SRS TPC command, a SRS beamforming indicator, etc.

The access node receives a SRS transmission (block 1907). The SRS transmission may be received from a UE that was the recipient of the DCI transmitted by the access node. The SRS may be received in accordance with the parameter for the scheduled PDSCH and the SRS request field transmitted in the DCI. As an example, the DCI included a FDRA field specifying PRBs for the scheduled PDSCH, and the SRS transmission is received in accordance with the PRBs specified in the FDRA field. The access node transmits the PDSCH (block 1909). The PDSCH is transmitted to the UE in accordance with the scheduling information of the PDSCH and the parameter.

In an embodiment, a control message may be utilized rather than a DCI. Examples of the control message include a DCI or an UL control information (UCI), a MAC CE, and a RRC configuration message.

FIG. 20 illustrates a flow diagram of example operations 2000 occurring in a UE receiving a PDSCH and associated SRS probing in an example enhanced DCI. Operations 2000 may be indicative of operations occurring in a UE as the UE receives the scheduling for a PDSCH and associated SRS probing using an example enhanced DCI.

Operations 2000 begin with the UE receiving a DCI (block 2005). The DCI may be received to schedule a PDSCH, for example. The DCI includes scheduling information for the PDSCH. In addition to the scheduling information for the PDSCH, the DCI includes a parameter for the scheduled PDSCH and a SRS request field. The parameter includes a frequency domain parameter or a spatial domain parameter, or both a frequency domain parameter and a spatial domain parameter. The frequency domain parameter may include a FDRA, for example, while the spatial domain parameter may include an antenna port(s) indication, for example. The DCI may also include one or more A-SRS parameters, including a SRS TDRA, a SRS slot indication, a SRS start symbol indication, a SRS allocation length indication, a SRS TPC command, a SRS beamforming indicator, etc.

The UE transmits a SRS transmission (block 2007). The SRS transmission may be transmitted to an access node that was the transmitter of the DCI received by the UE. The SRS may be transmitted in accordance with the parameter for the scheduled PDSCH and the SRS request field transmitted in the DCI. As an example, the DCI included a FDRA field specifying PRBs for the scheduled PDSCH, and the SRS transmission is transmitted in accordance with the PRBs specified in the FDRA field. The UE receives the PDSCH (block 2009). The PDSCH is received from the access node in accordance with the scheduling information of the PDSCH and the parameter.

In an embodiment, a control message may be utilized rather than a DCI. Examples of the control message include a DCI, a UCI, a MAC CE, and a RRC configuration message.

In some embodiments, the PDSCH transmission is one of multiple PDSCH transmissions following a DCI. In an embodiment, the PDSCH is a semi-persistent scheduled (SPS) PDSCH activated by the DCI, and the SRS is a semi-persistent (SP) SRS activated by the DCI, and the DCI includes a Cyclic redundancy check (CRC) scrambled by a Configured Scheduling (CS) Radio Network Temporary Identifier (RNTI) (CS-RNTI). For SPS PDSCHs, some transmission parameters are configured by RRC configuration signaling, but some other transmission parameters, e.g., FDRA and modulation order, are provided by a DCI with a CRC scrambled by a CS-RNTI. After receiving the DCI, the SPS PDSCH will be periodically received by the UE according to a periodicity configured by RRC configuration signaling, i.e., the SPS PDSCH is activated by the DCI, until the UE receives another DCI with a CRC scrambled by a CS-RNTI to deactivate or modify the SPS PDSCH. In some sense, the SPS PDSCH transmissions reuse the same DCI (the activation DCI) for multiple periodic PDSCH. The SPS PDSCH is useful for periodic traffic loads with reduced scheduling latency and DCI overhead, such as in URLLC and XR.

The use of a DCI as opposed to a MAC CE for activation has the benefit of reduced latency. In an embodiment, the DCI that activates the SPS PDSCH also activates the SP-SRS for interference probing. The SP-SRS transmission parameters, e.g., the FDRA, PRB allocation, spatial-domain parameters, etc., are based on the activation DCI. Therefore, one or more slots before each of the PDSCH transmissions, a SRS is transmitted to probe the interference, and the access node then adjusts the PDSCH precoding for the PDSCH transmission. In an embodiment, semi-persistent CSI-RS and optionally CSI-IM may also be activated by the same DCI and sent before each SRS transmission so that the SRS may adjust its precoding based on the CSI-RS/CSI-IM. These embodiments have the advantages that multiple SRS probing operations and multiple PDSCH transmissions can be supported with a single DCI and hence, has very low control overhead. Furthermore, the PDSCH transmissions may progressively improve as the procedure effectively becomes iterative BIT, which is suitable for XR with very frequent and periodic traffic arrivals, fixed wireless access (FWA), etc.

In some embodiments, one DCI may schedule multiple PDSCH transmissions over multiple slots, i.e., multi-slot scheduling or PDSCH repetition, and PDSCH precoding adjustment can be performed for the PDSCH transmissions after the A-SRS transmission triggered by the DCI. In yet some other embodiments, periodic or semi-persistent PDSCH, SRS, or CSI-RS are specified by higher-layer signaling, such as RRC configuration signaling or MAC CE, without using any DCI, and the SRS still reuses the PDSCH parameters for its transmission, e.g., the frequency-domain or spatial-domain parameters. If the PDSCH parameters are configured to change over different TTIs, the SRS transmission immediately before a PDSCH transmission also adopts the same parameters as the PDSCH. for example.

Figure 21:
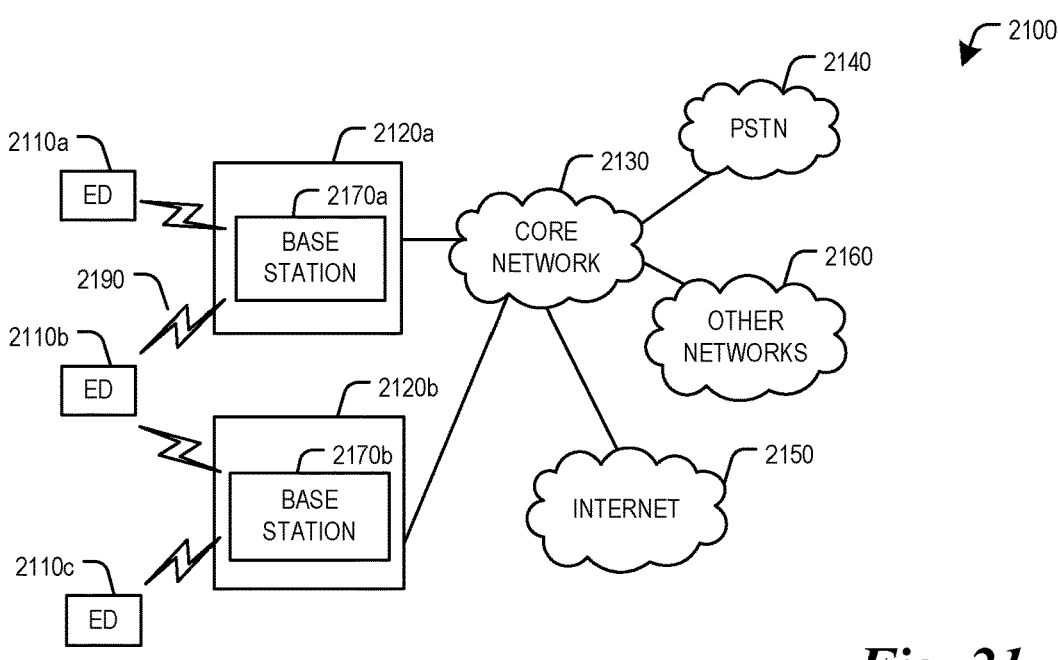
FIG. 21 illustrates an example communication system according to example embodiments presented herein.

FIG. 21 illustrates an example communication system 2100. In general, the system 2100 enables multiple wireless or wired users to transmit and receive data and other content. The system 2100 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 2100 includes electronic devices (ED) 2110a-2110c, radio access networks (RANs) 2120a-2120b, a core network 2130, a public switched telephone network (PSTN) 2140, the Internet 2150, and other networks 2160. While certain numbers of these components or elements are shown in FIG. 21, any number of these components or elements may be included in the system 2100.

The EDs 2110a-2110C are configured to operate or communicate in the system 2100. For example, the EDs 2110a-2110c are configured to transmit or receive via wireless or wired communication channels. Each ED 2110a-2110c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 2120a-2120b here include base stations 2170a-2170b, respectively. Each base station 2170a-2170b is configured to wirelessly interface with one or more of the EDs 2110a-2110C to enable access to the core network 2130, the PSTN 2140, the Internet 2150, or the other networks 2160. For example, the base stations 2170a-2170b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 2110a-2110c are configured to interface and communicate with the Internet 2150 and may access the core network 2130, the PSTN 2140, or the other networks 2160.

In the embodiment shown in FIG. 21, the base station 2170a forms part of the RAN 2120a, which may include other base stations, elements, or devices. Also, the base station 2170b forms part of the RAN 2120b, which may include other base stations, elements, or devices. Each base station 2170a-2170b operates to transmit or receive wireless signals within a particular geographic region or area, sometimes referred to as a "cell." In some embodiments, multiple-input multiple-output (MIMO) technology may be employed having multiple transceivers for each cell.

The base stations 2170a-2170b communicate with one or more of the EDs 2110a-2110C over one or more air interfaces 2190 using wireless communication links. The air interfaces 2190 may utilize any suitable radio access technology.

It is contemplated that the system 2100 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 2120a-2120b are in communication with the core network 2130 to provide the EDs 2110a-2110c with voice, data, application, Voice over Internet Protocol (VoIP), or other services. Understandably, the RANs 2120a-2120b or the core network 2130 may be in direct or indirect communication with one or more other RANs (not shown). The core network 2130 may also serve as a gateway access for other networks (such as the PSTN 2140, the Internet 2150, and the other networks 2160). In addition, some or all of the EDs 2110a-2110C may include functionality for communicating with different wireless networks over different wireless links using different wireless technologies or protocols. Instead of wireless communication (or in addition thereto), the EDs may communicate via wired communication channels to a service provider or switch (not shown), and to the Internet 2150.

Although FIG. 21 illustrates one example of a communication system, various changes may be made to FIG. 21. For example, the communication system 2100 could include any number of EDs, base stations, networks, or other components in any suitable configuration.

Figure 22A:
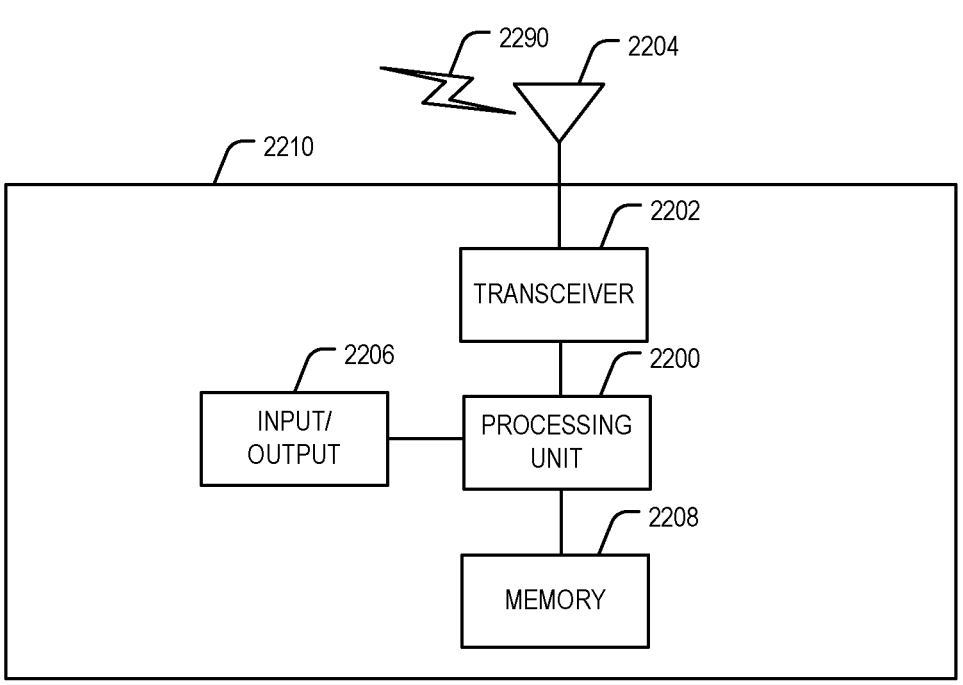
FIGS. 22A and 22B illustrate example devices that may implement the methods and teachings according to this disclosure.
Figure 22B:
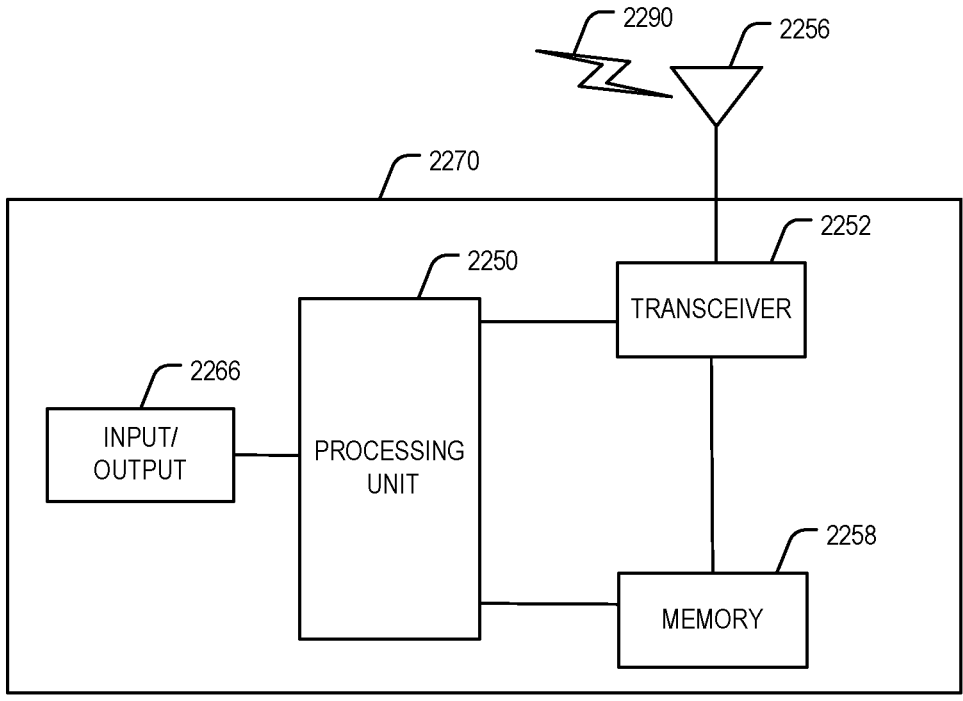

FIGS. 22A and 22B illustrate example devices that may implement the methods and teachings according to this disclosure. In particular, FIG. 22A illustrates an example ED 2210, and FIG. 22B illustrates an example base station 2270. These components could be used in the system 2100 or in any other suitable system.

As shown in FIG. 22A, the ED 2210 includes at least one processing unit 2200. The processing unit 2200 implements various processing operations of the ED 2210. For example, the processing unit 2200 could perform signal coding, data processing, power control, input/output processing, or any other functionality enabling the ED 2210 to operate in the system 2100. The processing unit 2200 also supports the methods and teachings described in more detail above. Each processing unit 2200 includes any suitable processing or computing device configured to perform one or more operations. Each processing unit 2200 could, for example, include a microprocessor, microcontroller, digital signal processor, field programmable gate array, or application specific integrated circuit.

The ED 2210 also includes at least one transceiver 2202. The transceiver 2202 is configured to modulate data or other content for transmission by at least one antenna or NIC (Network Interface Controller) 2204. The transceiver 2202 is also configured to demodulate data or other content received by the at least one antenna 2204. Each transceiver 2202 includes any suitable structure for generating signals for wireless or wired transmission or processing signals received wirelessly or by wire. Each antenna 2204 includes any suitable structure for transmitting or receiving wireless or wired signals. One or multiple transceivers 2202 could be used in the ED 2210, and one or multiple antennas 2204 could be used in the ED 2210. Although shown as a single functional unit, a transceiver 2202 could also be implemented using at least one transmitter and at least one separate receiver.

The ED 2210 further includes one or more input/output devices 2206 or interfaces (such as a wired interface to the Internet 2150). The input/output devices 2206 facilitate interaction with a user or other devices (network communications) in the network. Each input/output device 2206 includes any suitable structure for providing information to or receiving information from a user, such as a speaker, microphone, keypad, keyboard, display, or touch screen, including network interface communications.

In addition, the ED 2210 includes at least one memory 2208. The memory 2208 stores instructions and data used, generated, or collected by the ED 2210. For example, the memory 2208 could store software or firmware instructions executed by the processing unit(s) 2200 and data used to reduce or eliminate interference in incoming signals. Each memory 2208 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 22B, the base station 2270 includes at least one processing unit 2250, at least one transceiver 2252, which includes functionality for a transmitter and a receiver, one or more antennas 2256, at least one memory 2258, and one or more input/output devices or interfaces 2266. A scheduler, which would be understood by one skilled in the art, is coupled to the processing unit 2250. The scheduler could be included within or operated separately from the base station 2270. The processing unit 2250 implements various processing operations of the base station 2270, such as signal coding, data processing, power control, input/output processing, or any other functionality. The processing unit 2250 can also support the methods and teachings described in more detail above. Each processing unit 2250 includes any suitable processing or computing device configured to perform one or more operations. Each processing unit 2250 could, for example, include a microprocessor, microcontroller, digital signal processor, field programmable gate array, or application specific integrated circuit.

Each transceiver 2252 includes any suitable structure for generating signals for wireless or wired transmission to one or more EDs or other devices. Each transceiver 2252 further includes any suitable structure for processing signals received wirelessly or by wire from one or more EDs or other devices. Although shown combined as a transceiver 2252, a transmitter and a receiver could be separate components. Each antenna 2256 includes any suitable structure for transmitting or receiving wireless or wired signals. While a common antenna 2256 is shown here as being coupled to the transceiver 2252, one or more antennas 2256 could be coupled to the transceiver(s) 2252, allowing separate antennas 2256 to be coupled to the transmitter and the receiver if equipped as separate components. Each memory 2258 includes any suitable volatile or non-volatile storage and retrieval device(s). Each input/output device 2266 facilitates interaction with a user or other devices (network communications) in the network. Each input/output device 2266 includes any suitable structure for providing information to or receiving/providing information from a user, including network interface communications.

Figure 23:
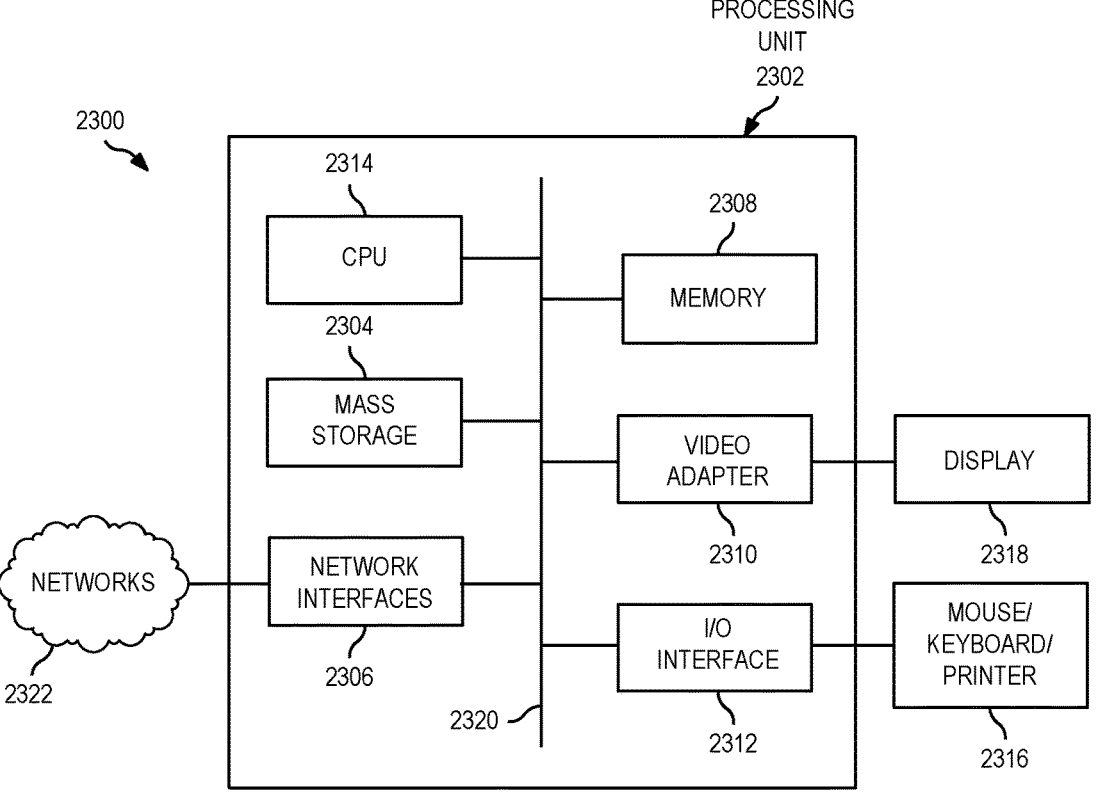
FIG. 23 is a block diagram of a computing system that may be used for implementing the devices and methods disclosed herein.

FIG. 23 is a block diagram of a computing system 2300 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 2300 includes a processing unit 2302. The processing unit includes a central processing unit (CPU) 2314, memory 2308, and may further include a mass storage device 2304, a video adapter 2310, and an I/O interface 2312 connected to a bus 2320.

The bus 2320 may be one or more of any type of several bus architectures including a memory bus or memory controller, a peripheral bus, or a video bus. The CPU 2314 may comprise any type of electronic data processor. The memory 2308 may comprise any type of non-transitory system memory such as static random access memory (SRAM), dynamic random access memory (DRAM), synchronous DRAM (SDRAM), read-only memory (ROM), or a combination thereof. In an embodiment, the memory 2308 may include ROM for use at boot-up, and DRAM for program and data storage for use while executing programs.

The mass storage 2304 may comprise any type of non-transitory storage device configured to store data, programs, and other information and to make the data, programs, and other information accessible via the bus 2320. The mass storage 2304 may comprise, for example, one or more of a solid state drive, hard disk drive, a magnetic disk drive, or an optical disk drive.

The video adapter 2310 and the I/O interface 2312 provide interfaces to couple external input and output devices to the processing unit 2302. As illustrated, examples of input and output devices include a display 2318 coupled to the video adapter 2310 and a mouse, keyboard, or printer 2316 coupled to the I/O interface 2312. Other devices may be coupled to the processing unit 2302, and additional or fewer interface cards may be utilized. For example, a serial interface such as Universal Serial Bus (USB) (not shown) may be used to provide an interface for an external device.

The processing unit 2302 also includes one or more network interfaces 2306, which may comprise wired links, such as an Ethernet cable, or wireless links to access nodes or different networks. The network interfaces 2306 allow the processing unit 2302 to communicate with remote units via the networks. For example, the network interfaces 2306 may provide wireless communication via one or more transmitters/transmit antennas and one or more receivers/receive antennas. In an embodiment, the processing unit 2302 is coupled to a local-area network 2322 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method, comprising:
transmitting, by an access node to a user equipment (UE), a control information message scheduling a physical downlink shared channel (PDSCH), the control information message comprising at least one parameter for both the PDSCH and a sounding reference signal (SRS) request field;
receiving, by the access node from the UE, an SRS transmission in accordance with the at least one parameter for both the PDSCH and the SRS request field in the control information message; and
transmitting, by the access node to the UE, the PDSCH in accordance with the at least one parameter.

2. The method of claim 1, the at least one parameter for both the PDSCH and the SRS request field comprising at least one of a frequency domain parameter or a spatial domain parameter.

3. The method of claim 1, the control information message comprising at least one of a downlink control information (DCI) message, a media access control (MAC) control element (CE) or a radio resource control (RRC) configuration message.

4. The method of claim 2, the control information message further comprising at least one aperiodic SRS (A-SRS) time domain parameter, or the frequency domain parameter is indicated by a frequency domain resource assignment (FDRA) field in the control information message.

5. The method of claim 2, the spatial domain parameter being indicated by an antenna port field in the control information message.

6. The method of claim 4, the at least one A-SRS time domain parameter being indicated by a first SRS time domain resource assignment (TDRA) field in the control information message or the at least one A-SRS time domain parameter comprising at least one of an SRS slot indication, an SRS start symbol indication, or an SRS allocation length indication in the control information message.

7. The method of claim 1, the PDSCH being a semi-persistent scheduled (SPS) PDSCH activated by the control information message, an SRS of the SRS transmission being a semi-persistent (SP) SRS activated by the control information message, and the control information message including a cyclic redundancy check (CRC) scrambled by a Configured Scheduling (CS) Radio Network Temporary Identifier (RNTI) (CS-RNTI).

8. A method, comprising:

receiving, by a user equipment (UE) from an access node, a control information message scheduling a physical downlink shared channel (PDSCH), the control information message comprising at least one parameter for both the PDSCH and a sounding reference signal (SRS) request field;

transmitting, by the UE to the access node, an SRS transmission in accordance with the at least one parameter for both the PDSCH and the SRS request field in the control information message; and receiving, by the UE from the access node, the PDSCH in accordance with the at least one parameter.

9. The method of claim 8, the at least one parameter for both the PDSCH and the SRS request field comprising at least one of a frequency domain parameter or a spatial domain parameter.

10. The method of claim 9, the control information message further comprising at least one aperiodic SRS (A-SRS) time domain parameter, or the frequency domain parameter is indicated by a frequency domain resource assignment (FDRA) field in the control information message.

11. The method of claim 9, the spatial domain parameter being indicated by an antenna port field in the control information message.

12. The method of claim 11, the PDSCH being received with antenna ports associated with the antenna port field.

13. The method of claim 8, the SRS transmission being transmitted in a first slot indicated by a first SRS TDRA field, and the PDSCH being received in a second slot indicated by a second TDRA field for the PDSCH.

14. An access node, comprising:

one or more processors; and a non-transitory memory storage storing instructions that, when executed by the one or more processors, cause the access node to perform operations including:

transmitting, to a user equipment (UE), a control information message scheduling a physical downlink shared channel (PDSCH), the control information message comprising at least one parameter for both the PDSCH and a sounding reference signal (SRS) request field;

receiving, from the UE, an SRS transmission in accordance with the at least one parameter for both the PDSCH and the SRS request field in the control information message; and transmitting, to the UE, the PDSCH in accordance with the at least one parameter.

15. A user equipment (UE), comprising:

one or more processors; and a non-transitory memory storage storing instructions that, when executed by the one or more processors, cause the UE to perform operations including:

receiving, from an access node, a control information message scheduling a physical downlink shared channel (PDSCH), the control information message comprising at least one parameter for both the PDSCH and a sounding reference signal (SRS) request field;

transmitting, to the access node, an SRS transmission in accordance with the at least one parameter for both the PDSCH and the SRS request field in the control information message;

receiving, from the access node, the PDSCH in accordance with the at least one parameter; and processing data in the PDSCH.

16. The UE of claim 15, the at least one parameter for both the PDSCH and the SRS request field comprising at least one of a frequency domain parameter or a spatial domain parameter.

17. The UE of claim 16, the control information message further comprising at least one aperiodic SRS (A-SRS) time domain parameter, or the frequency domain parameter is indicated by a frequency domain resource assignment (FDRA) field in the control information message.

18. The UE of claim 16, the spatial domain parameter being indicated by an antenna port field in the control information message.

19. The access node of claim 14, the at least one parameter for both the PDSCH and the SRS request field comprising at least one of a frequency domain parameter or a spatial domain parameter.

20. The access node of claim 14, the control information message comprising at least one of a downlink control information (DCI) message, a media access control (MAC) control element (CE) or a radio resource control (RRC) configuration message.

* * * * *